US012699948B2

(12) United States Patent
Dinga et al.

(10) Patent No.: US 12,699,948 B2
(45) Date of Patent: Aug. 4, 2026

(54) USER INTERFACE VISUALIZATION TOOL FOR GENERATING AND ANALYZING SUPPLY CHAIN SCENARIOS

(71) Applicant: Blue Yonder Group, Inc., Scottsdale, AZ (US)

(72) Inventors: Jindrich Dinga, Mountain View, CA (US); Anton Vonorych, Ternopil (UA); Pradeep Baldi, Irving, TX (US); Joerg Beringer, Redwood City, CA (US)

(73) Assignee: Blue Yonder Group, Inc., Scottsdale, AZ (US)

( * ) Notice: Subject to any disclaimer, the term of this patent is extended or adjusted under 35 U.S.C. 154(b) by 0 days.

(21) Appl. No.: 18/936,519

(22) Filed: Nov. 4, 2024

(65) Prior Publication Data

US 2025/0078012 A1     Mar. 6, 2025

Related U.S. Application Data

(63) Continuation-in-part of application No. 17/824,717, filed on May 25, 2022.
(Continued)

(51) Int. Cl.
*G06Q 10/083* (2024.01)
*G06F 3/04842* (2022.01)
(52) U.S. Cl.
CPC ....... *G06Q 10/083* (2013.01); *G06F 3/04842* (2013.01)
(58) Field of Classification Search
CPC .................................................. G06F 3/04842
See application file for complete search history.

(56) References Cited

U.S. PATENT DOCUMENTS 8,620,729 B2     12/2013     Srinivasa et al.
11,468,387 B2   10/2022     Saarenvirta
(Continued)

FOREIGN PATENT DOCUMENTS

DE     102004023265 A1     1/2005

OTHER PUBLICATIONS

S. Mesbah and S. M. Harras, "Enterprise competitive advantages optimization through logistics activities simulation of supply chain," 2013 5th International Conference on Modelling, Identification and Control (ICMIC), Cairo, Egypt, 2013, pp. 32-41. (Year: 2013).*
(Continued)

*Primary Examiner* — George Chen
*Assistant Examiner* — Tayar M Kyu
(74) *Attorney, Agent, or Firm* — Spencer Fane LLP; Steven J. Laureanti

(57) ABSTRACT

A system and method are disclosed for visualizing and modifying a model of a supply chain network. The method includes performing a polytope analysis using goals and levers, generating a network modeler GUI of a modeled supply chain network associated with the polytope analysis, receiving a selection to edit one or more node icons of the modeled supply chain network displayed on the network modeler GUI, receiving a selection to add one or more transportation lanes to the modeled supply chain network, receiving a selection to add one or more levers to the modeled supply chain network, receiving a selection to modify the modeled supply chain network, updating the polytope analysis based on at least one of the received selections, and generating and displaying a response plan based on the updated polytope analysis.

20 Claims, 19 Drawing Sheets

1800

1802 — PERFORM POLYTOPE ANALYSIS

1804 — DISPLAY NETWORK MODELER GUI

1806 — SELECT AND EDIT NODE ICON

1808 — ADD LANES

1810 — ADD LEVERS

1812 — MODIFY NETWORK MODEL

1814 — UPDATE POLYTOPE ANALYSIS

Related U.S. Application Data

(60) Provisional application No. 63/551,780, filed on Feb. 9, 2024, provisional application No. 63/624,574, filed on Jan. 24, 2024, provisional application No. 63/621,767, filed on Jan. 17, 2024, provisional application No. 63/619,598, filed on Jan. 10, 2024, provisional application No. 63/193,804, filed on May 27, 2021.

(56) References Cited

U.S. PATENT DOCUMENTS

| | | |
|---|---|---|
| 2011/0270646 A1 | 11/2011 | Prasanna et al. |
| 2012/0035984 A1* | 2/2012 | Gorur Narayana Srinivasa .......... G06Q 10/06375 705/7.35 |
| 2013/0080200 A1 | 3/2013 | Connolly et al. |
| 2016/0217406 A1* | 7/2016 | Najmi .............. G06Q 10/06315 |
| 2017/0236086 A1 | 8/2017 | Simon |
| 2019/0295023 A1 | 9/2019 | Gardner et al. |
| 2019/0295032 A1* | 9/2019 | Tilly ................... G06Q 10/087 |
| 2020/0126014 A1* | 4/2020 | Bajaj ...................... G06N 20/00 |
| 2021/0117896 A1 | 4/2021 | Koc et al. |
| 2021/0192430 A1 | 6/2021 | Bennice et al. |
| 2021/0248528 A1 | 8/2021 | Iwata |

OTHER PUBLICATIONS

Klibi et al., "Scenario-based Supply Chain Network risk modeling," European Journal of Operational Research vol. 223, Issue 3, Dec. 16, 2012, pp. 644-658 (Year: 2012).

* cited by examiner

FIG. 2

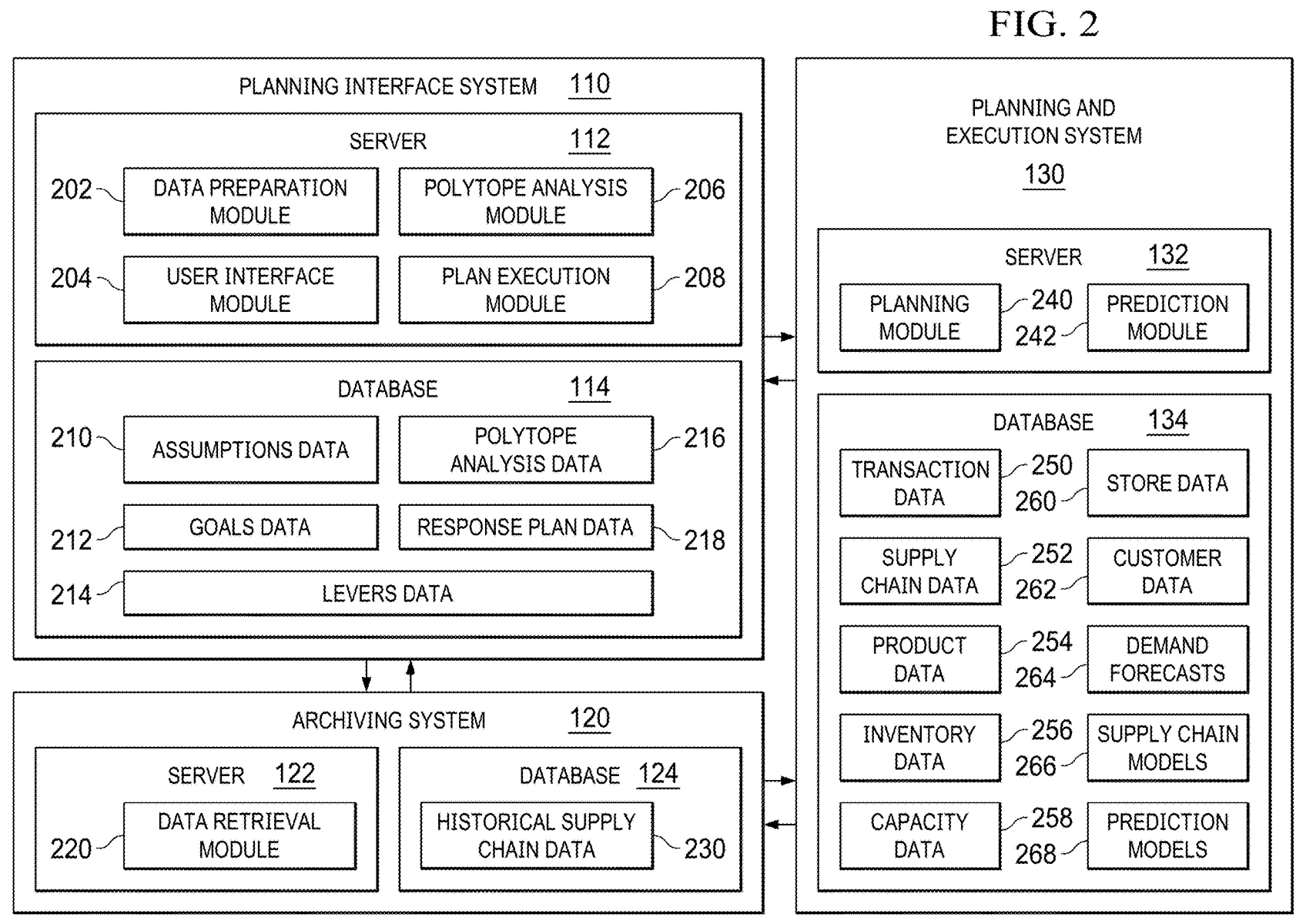

PLANNING AND EXECUTION SYSTEM 130

SERVER 132

240 — PLANNING MODULE
242 — PREDICTION MODULE

DATABASE 134

250 — TRANSACTION DATA
260 — STORE DATA
252 — SUPPLY CHAIN DATA
262 — CUSTOMER DATA
254 — PRODUCT DATA
264 — DEMAND FORECASTS
256 — INVENTORY DATA
266 — SUPPLY CHAIN MODELS
258 — CAPACITY DATA
268 — PREDICTION MODELS

PLANNING INTERFACE SYSTEM 110

SERVER 112

202 — DATA PREPARATION MODULE
206 — POLYTOPE ANALYSIS MODULE
204 — USER INTERFACE MODULE
208 — PLAN EXECUTION MODULE

DATABASE 114

210 — ASSUMPTIONS DATA
216 — POLYTOPE ANALYSIS DATA
212 — GOALS DATA
218 — RESPONSE PLAN DATA
214 — LEVERS DATA

ARCHIVING SYSTEM 120

SERVER 122

220 — DATA RETRIEVAL MODULE

DATABASE 124

230 — HISTORICAL SUPPLY CHAIN DATA

300

302    GENERATE ASSUMPTION

304    BUNDLE ASSUMPTION
       INTO PERSPECTIVE

306    CREATE ASSUMPTION VARIANTS

308    MODEL SCOPE AND IMPACT
       OF ASSUMPTION VARIANT

310    GENERATE MITIGATION OPTIONS
       FOR ASSUMPTION VARIANT

312    BUILD RESPONSE PLAN AND
       DELIVER RECOMMENDATION

314    DISPLAY ASSUMPTION
       AND ASSOCIATED DATA

316    EXECUTE MITIGATION STRATEGY

400

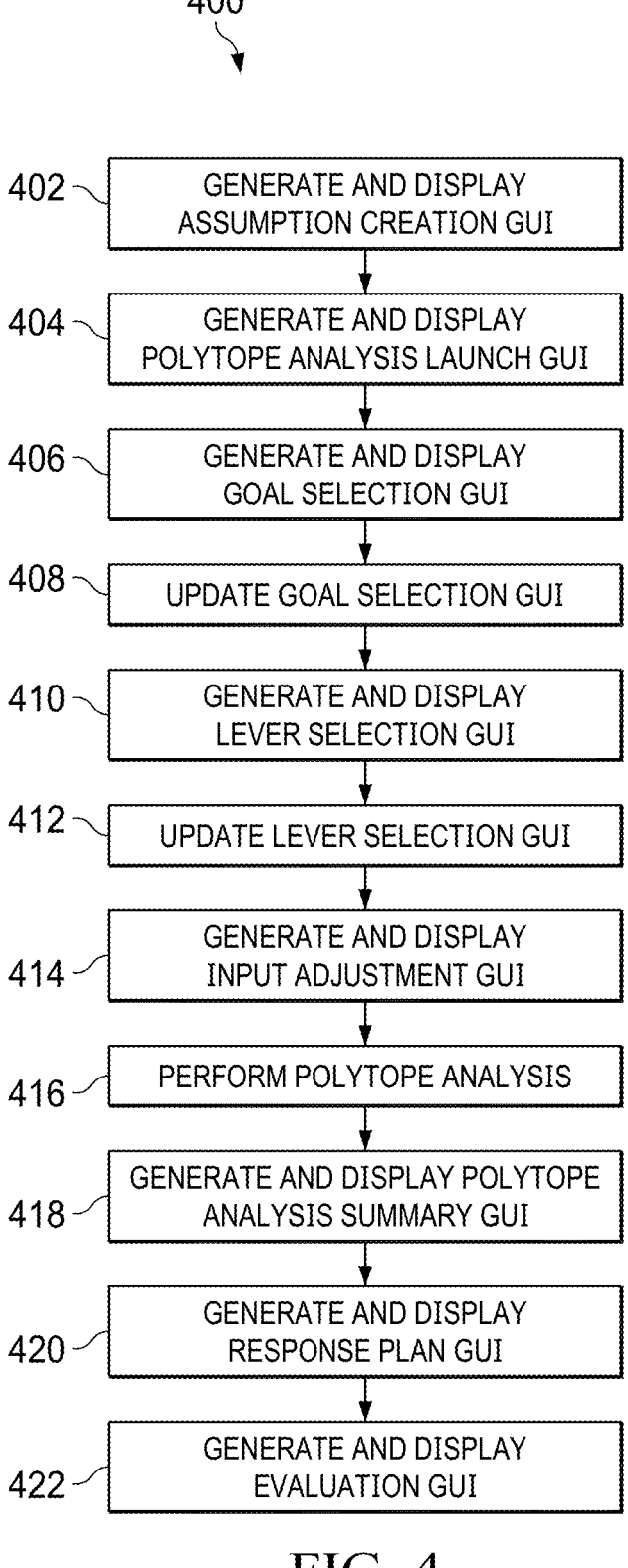

402 — GENERATE AND DISPLAY
ASSUMPTION CREATION GUI

404 — GENERATE AND DISPLAY
POLYTOPE ANALYSIS LAUNCH GUI

406 — GENERATE AND DISPLAY
GOAL SELECTION GUI

408 — UPDATE GOAL SELECTION GUI

410 — GENERATE AND DISPLAY
LEVER SELECTION GUI

412 — UPDATE LEVER SELECTION GUI

414 — GENERATE AND DISPLAY
INPUT ADJUSTMENT GUI

416 — PERFORM POLYTOPE ANALYSIS

418 — GENERATE AND DISPLAY POLYTOPE
ANALYSIS SUMMARY GUI

420 — GENERATE AND DISPLAY
RESPONSE PLAN GUI

422 — GENERATE AND DISPLAY
EVALUATION GUI

FIG. 4

IBP 〉 Sell More Item A 〉 Polytope Analysis

Polytope Analysis  ( Completed )

Input Specification          About

Goals    <u>902</u>

Goals below were used in the following order as an input.

1. Margin         Max
2. Service Level   Max
3. Carbon footprint Min

Levers

The following levers and their respective values were used as an input.

Change Price

| Product | Channel | Min | Max | Step Size |
|---------|---------|-----|-----|-----------|
| Item A | Retail | $100 | $150 | $10 |

Add Inter-Region Transfer Lane

| Product | To | From | Transfer Mode |
|---------|-----|------|---------------|
| Item A | Los Angeles, New York | Dallas | Road, Air |

Add Capacity

| Resource | Location | Min | Max | Step Size |
|----------|----------|-----|-----|-----------|
| Packaging Capacity | Facility 1 | 1 Shift | 4 Shifts | 1 Shift |

Add New Export Source

| Product | To | From | Transfer Mode |
|---------|-----|------|---------------|
| Item A | New York, Los Angeles, Dallas | Amsterdam, Osaka | Ocean, Air |

Figure 10:
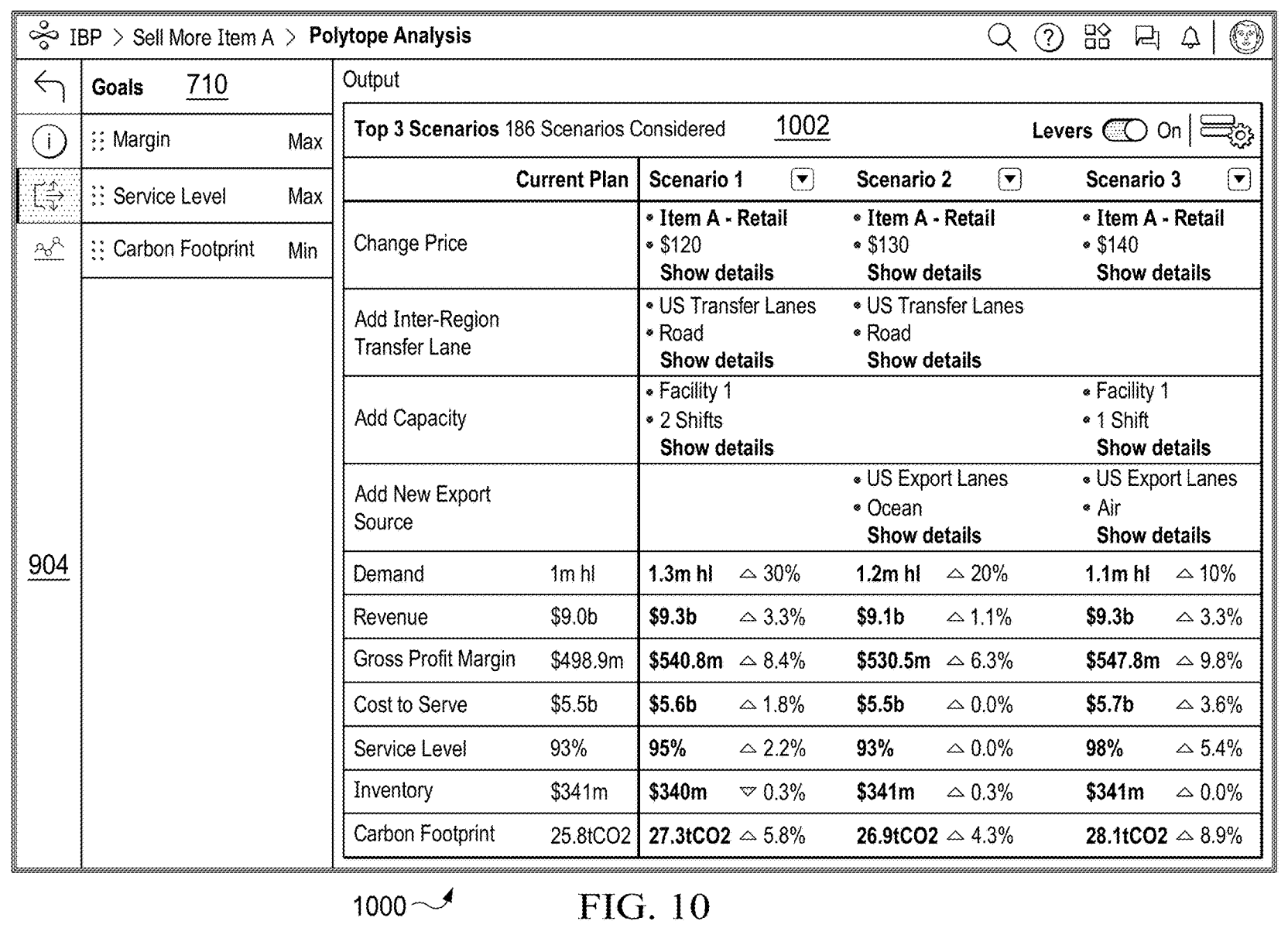

IBP > Sell More Item A > Polytope Analysis

Goals _710_

| | |
|---|---|
| Margin | Max |
| Service Level | Max |
| Carbon Footprint | Min |

Output

Top 3 Scenarios 186 Scenarios Considered _1002_    Levers ◯ On

| | Current Plan | Scenario 1 | Scenario 2 | Scenario 3 |
|---|---|---|---|---|
| Change Price | | • Item A - Retail<br>• $120<br>Show details | • Item A - Retail<br>• $130<br>Show details | • Item A - Retail<br>• $140<br>Show details |
| Add Inter-Region Transfer Lane | | • US Transfer Lanes<br>• Road<br>Show details | • US Transfer Lanes<br>• Road<br>Show details | |
| Add Capacity | | • Facility 1<br>• 2 Shifts<br>Show details | | • Facility 1<br>• 1 Shift<br>Show details |
| Add New Export Source | | | • US Export Lanes<br>• Ocean<br>Show details | • US Export Lanes<br>• Air<br>Show details |
| Demand | 1m hl | 1.3m hl  △ 30% | 1.2m hl  △ 20% | 1.1m hl  △ 10% |
| Revenue | $9.0b | $9.3b  △ 3.3% | $9.1b  △ 1.1% | $9.3b  △ 3.3% |
| Gross Profit Margin | $498.9m | $540.8m  △ 8.4% | $530.5m  △ 6.3% | $547.8m  △ 9.8% |
| Cost to Serve | $5.5b | $5.6b  △ 1.8% | $5.5b  △ 0.0% | $5.7b  △ 3.6% |
| Service Level | 93% | 95%  △ 2.2% | 93%  △ 0.0% | 98%  △ 5.4% |
| Inventory | $341m | $340m  ▽ 0.3% | $341m  △ 0.3% | $341m  △ 0.0% |
| Carbon Footprint | 25.8tCO2 | 27.3tCO2  △ 5.8% | 26.9tCO2  △ 4.3% | 28.1tCO2  △ 8.9% |

USER INTERFACE VISUALIZATION TOOL FOR GENERATING AND ANALYZING SUPPLY CHAIN SCENARIOS

CROSS-REFERENCE TO RELATED APPLICATIONS

This application is a continuation in part of U.S. patent application Ser. No. 17/824,717, filed May 25, 2022, entitled "Assumption-Based Planning," which claims the benefit under 35 U.S.C. § 119(e) to U.S. Provisional Application No. 63/193,804, filed May 27, 2021, entitled "Assumption-Based Planning." The present disclosure is also related to that disclosed in the U.S. Provisional Application No. 63/619,598, filed Jan. 10, 2024, entitled "User Interface Tool for Generating and Analyzing Scenarios for Assumption Planning," U.S. Provisional Application No. 63/621,767, filed Jan. 17, 2024, entitled "User Interface Tool for Polytope Analysis," U.S. Provisional Application No. 63/624,574, filed Jan. 24, 2024, entitled "User Interface Tool for Generating and Analyzing Scenarios for Supply Chain," and U.S. Provisional Application No. 63/551,780, filed Feb. 9, 2024, entitled "User Interface Visualization Tool for Generating and Analyzing Supply Chain Scenarios." U.S. application Ser. No. 17/824,717, and U.S. Provisional Application Nos. 63/193,804, 63/619,598, 63/621,767, 63/624,574, and 63/551,780 are assigned to the assignee of the present application.

TECHNICAL FIELD

The present disclosure relates generally to supply chain planning and more specifically user interfaces for supply chain planning.

BACKGROUND

Supply chain planning, such as sales and operations planning, demand planning, and inventory planning, may require significant investments in scenario modeling to generate supply chain models that represent actual supply chain features and quantities and to generate and evaluate one or more what-if supply chain scenarios. Existing supply chain planning systems require multiple planners to work in sequence considering possible what-if supply chain scenarios in turn, with many decision points and meetings involved throughout, resulting in lengthy, manpower-intensive, and inefficient supply chain planning. Further, in existing supply chain planning systems, what-if supply chain scenarios are considered only on planner initiative, which may lead to missing important scenarios and overlooking the best options for future plans. As a result, existing supply chain planning systems are inefficient, error-prone, and may lead to suboptimal supply chain decisions, all of which are undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

FIG. 2 illustrates the planning interface system, the archiving system, and the planning and execution system of FIG. 1 in greater detail, in accordance with an embodiment;

FIG. 4 illustrates a method for performing assumption-based planning, in accordance with an embodiment;

FIG. 9 illustrates an analysis summary graphical user interface, in accordance with an embodiment;

FIG. 10 illustrates a response plan graphical user interface, in accordance with an embodiment;

DETAILED DESCRIPTION

Figure 1:
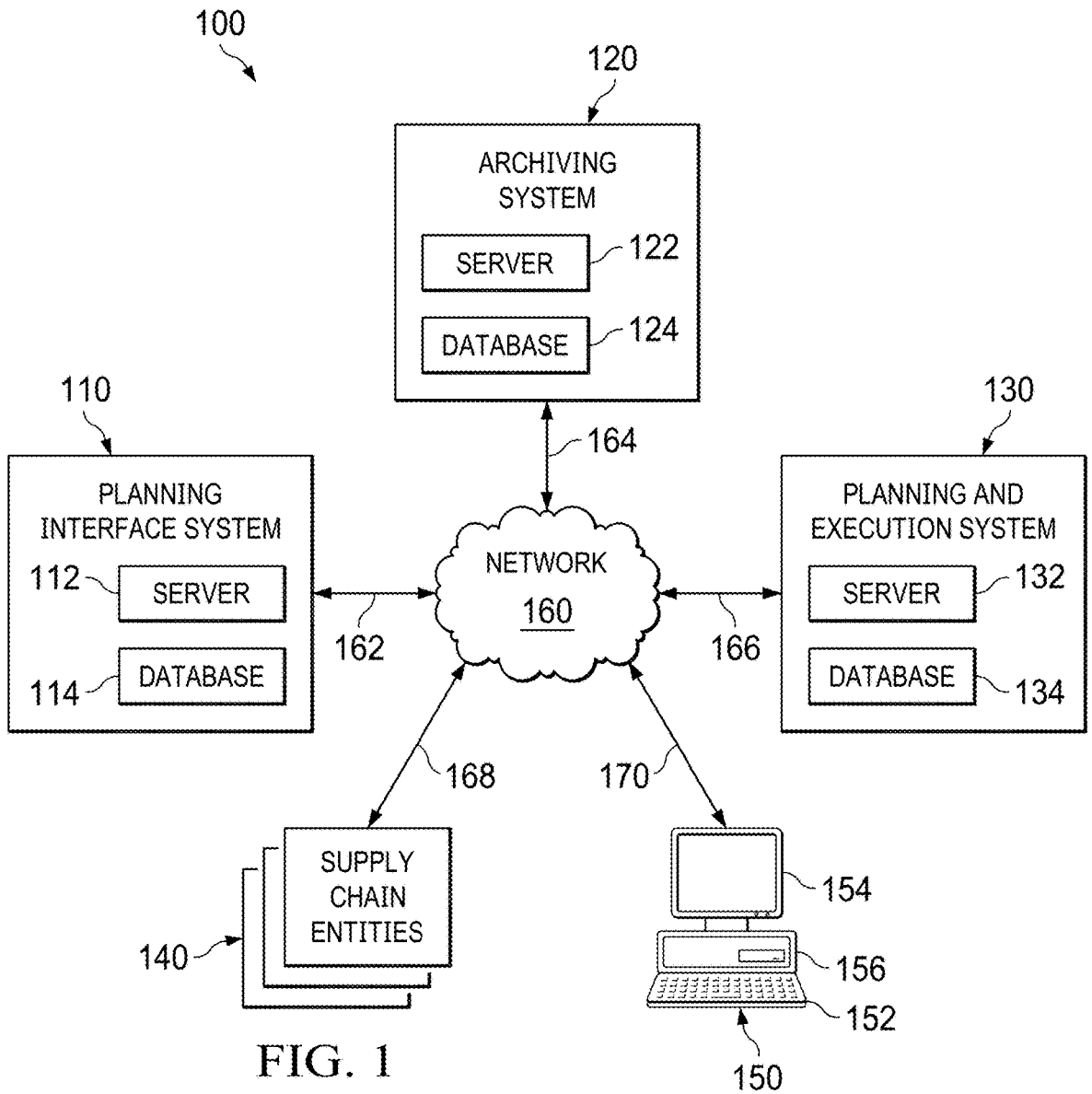
FIG. 1 illustrates a supply chain network, in accordance with a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are illustrated or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

As described in more detail below, embodiments of the following disclosure provide systems and methods for generating and utilizing one or more assumption system objects to store hierarchical relationships of potential supply chain scenarios and to prepare for potential future contingencies and scenarios using assumptions. Embodiments generate one or more assumptions, which may be defined for the purposes of this disclosure as explicit data objects used to capture scope, impact, and optional mitigation actions related to internal or external influencing factors that affect one or more supply chain entities within a supply chain network. Systems and methods described herein may store the assumptions and generate hierarchical assumption variants, while also modeling the scope and potential impact the assumption variants may have on the supply chain network. Embodiments further generate mitigation options for assumption variants, build response plans, and deliver recommendations that may be executed in response to events that are associated with the assumptions and/or assumption variants.

Embodiments of the following disclosure generate and display one or more graphical user interfaces (GUIs) that enable supply chain planners to generate assumptions for use in assumption-based planning, choose and adjust the priority and order of goals for assumption-based planning, select and adjust various levers or parameters for assumption-based planning, view the results of assumption-based planning, and select one or more response plans. Use of embodiments enable collaborative assumption-based planning to model and prepare actions for various event outcomes and what-if scenarios.

FIG. 1 illustrates supply chain network 100, in accordance with a first embodiment. Supply chain network 100 comprises planning interface system 110, archiving system 120, planning and execution system 130, one or more supply chain entities 140, one or more computers 150, network 160, and one or more communication links 162-170. Although a single planning interface system 110, a single archiving system 120, a single planning and execution system 130, one or more supply chain entities 140, one or more computers 150, a single network 160, and one or more communication links 162-170 are illustrated and described, embodiments contemplate any number of planning interface systems, archiving systems, planning and execution system, supply chain entities, computers, networks, or communication links, according to particular needs.

In one embodiment, planning interface system 110 comprises server 112 and database 114. Although planning interface system 110 is illustrated in FIG. 1 as comprising a single server 112 and a single database 114, embodiments contemplate planning interface system 110 including any suitable number of servers, databases, serverless computing options, or data stores internal to, or externally coupled with, planning interface system 110, according to particular needs. As explained in more detail below, planning interface system 110 uses assumptions and generated hierarchies of assumption variants to model a scope and potential impact that the assumption variants may have on supply chain network 100. According to embodiments, planning interface system 110 displays one or more graphic user interfaces (GUIs) that enable a user, such as a supply chain planner, to generate and select input for an assumption-based planning process, review output and response plans generated via the assumption-based planning process, re-run the assumption-based planning process with modified input parameters, and/or select and automatically implement a response plan. Planning interface system 110 may utilize, for example, one or more pieces of automated machinery of one or more supply chain entities 140, as described in further detail below, to automatically implement a response plan.

Archiving system 120 comprises server 122 and database 124. Although archiving system 120 is illustrated as comprising single server 122 and single database 124, embodiments contemplate any suitable number of servers or databases internal to, or externally coupled with, archiving system 120. Server 122 of archiving system 120 may support one or more processes for receiving and storing data from planning and execution system 130, one or more supply chain entities 140, and/or one or more computers 150 of supply chain network 100. According to some embodiments, archiving system 120 comprises an archive of data received from planning and execution system 130, one or more supply chain entities 140, and/or one or more computers 150 of supply chain network 100 and provides archived data to planning interface system 110 and/or planning and execution system 130 to, for example, generate assumptions and assumption variants, perform polytope analyses, and the like. Server 122 may store the received data in database 124, which may comprise one or more databases or other data storage arrangements at one or more locations local to, or remote from, server 122.

According to an embodiment, planning and execution system 130 comprises server 132 and database 134. Supply chain planning and execution is typically performed by several distinct and dissimilar processes, including, for example, strategic assortment planning, demand forecasting, planning, operations planning, production planning, supply planning, distribution planning, execution, pricing, forecasting, transportation management, warehouse management, inventory management, fulfillment, procurement, and the like. Server 132 of planning and execution system 130 comprises one or more modules, such as, for example, a sourcing module, a scheduling module, and/or a pick-pack-ship module for performing one or more order fulfillment processes. Server 132 stores and retrieves data from database 134 or one or more locations in supply chain network 100. In addition, planning and execution system 130 operates on one or more computers 150 that are integral to, or separate from, the hardware and/or software that support archiving system 120 and planning interface system 110.

One or more supply chain entities 140 may represent one or more suppliers, one or more manufacturers, one or more distribution centers, and one or more retailers in supply chain network 100, including one or more enterprises. One or more suppliers may be any suitable entity that offers to sell or otherwise provides one or more items or components to one or more manufacturers or buyers. One or more suppliers may, for example, receive an item from a first supply chain entity of one or more supply chain entities 140 in supply chain network 100 and provide the item to another supply chain entity of one or more supply chain entities 140, which in some embodiments may be a buyer, a customer, or an end user. Items may comprise, for example, components, materials, products, parts, supplies, or other items that may be used to produce products. In addition, or as an alternative, an item may comprise a supply or resource that is used to manufacture the item but does not become a part of the item. In embodiments, items may comprise a service, such as an installation service. One or more suppliers may comprise automated distribution systems that automatically transport items to one or more manufacturers based, at least in part, on a supply chain plan having fair-shared items or resources, a material or capacity reallocation, current and projected inventory levels, and/or one or more additional factors described herein.

A manufacturer may be any suitable entity that manufactures at least one product. A manufacturer may use one or more items during the manufacturing process to produce any manufactured, fabricated, assembled, or otherwise processed item, material, component, good, or product. In one embodiment, a product represents an item ready to be supplied to, for example, another supply chain entity of one or more supply chain entities 140, such as a supplier, an item that needs further processing, or any other item. A manufacturer may, for example, produce and sell a product to a supplier, another manufacturer, a distribution center, a retailer, a customer, or any other suitable person or an entity. Such manufacturers may comprise automated robotic production machinery that produce products based, at least in part, on a supply chain plan having fair-shared items or resources, a material or capacity reallocation, current and projected inventory levels, and/or one or more additional factors described herein.

One or more distribution centers may be any suitable entity that offers to sell or otherwise distributes at least one product to one or more retailers and/or customers. Distribution centers may, for example, receive a product from a first supply chain entity of one or more supply chain entities 140 in supply chain network 100 and store and transport the product for a second supply chain entity of one or more supply chain entities 140. Such distribution centers may comprise automated warehousing systems that automatically transport products to one or more retailers or customers and/or automatically remove an item from, or place an item into, inventory based, at least in part, on a supply chain plan having fair-shared items or resources, a material or capacity reallocation, current and projected inventory levels, and/or one or more additional factors described herein.

One or more retailers may be any suitable entity that obtains one or more products to sell to one or more customers. In addition, one or more retailers may sell, store, and supply one or more components and/or repair a product with one or more components. One or more retailers may comprise any online or brick and mortar location, including locations with shelving systems. Shelving systems may comprise, for example, various racks, fixtures, brackets, notches, grooves, slots, or other attachment devices for fixing shelves in various configurations. These configurations may comprise shelving with adjustable lengths, heights, and other arrangements, which may be adjusted by an employee of one or more retailers based on computer-generated instructions or automatically by machinery to place products in a desired location.

The same supply chain entity may simultaneously act as any one or more suppliers, manufacturers, distribution centers, and retailers. For example, one or more supply chain entities 140 acting as a manufacturer may produce a product, and the same entity may act as a supplier to supply a product to another supply chain entity of one or more supply chain entities 140. Although one example of supply chain network 100 is illustrated and described, embodiments contemplate any configuration of supply chain network 100 without departing from the scope of the present disclosure.

As illustrated in FIG. 1, supply chain network 100 comprising planning interface system 110, archiving system 120, planning and execution system 130, and one or more supply chain entities 140 may operate on one or more computers 150 that are integral to, or separate from, the hardware and/or software that support planning interface system 110, archiving system 120, planning and execution system 130, and one or more supply chain entities 140. One or more computers 150 may include any suitable input device 152, such as a keypad, mouse, touch screen, microphone, or other device to input information, and one or more output devices 154, including, but not limited to, monitors and/or speakers, to output information associated with the operation of supply chain network 100, such as, for example, digital or analog data, visual information, or audio information. One or more computers 150 may include fixed or removable computer-readable storage media, including non-transitory computer-readable media, magnetic computer disks, flash drives, CD-ROM, in-memory device, or other suitable media to receive output from and provide input to supply chain network 100.

One or more computers 150 may further include one or more processors 156 and associated memory to execute instructions and manipulate information according to the operation of supply chain network 100 and any of the methods described herein. In addition, or as an alternative, embodiments contemplate executing the instructions on one or more computers 150 that cause one or more computers 150 to perform functions of the methods. An apparatus implementing special purpose logic circuitry, such as, for example, one or more field-programmable gate arrays (FPGA) or application-specific integrated circuits (ASIC), may perform functions of the methods described herein. Further examples may also include articles of manufacture, including tangible non-transitory computer-readable media that have computer-readable instructions encoded thereon, and the instructions may comprise instructions to perform functions of the methods described herein.

In addition, or as an alternative, supply chain network 100 may comprise a cloud-based computing system having processing and storage devices at one or more locations local to, or remote from, planning interface system 110, archiving system 120, planning and execution system 130, and one or more supply chain entities 140. In addition, each of one or more computers 150 may be a workstation, personal computer (PC), network computer, notebook computer, tablet, personal digital assistant (PDA), cell phone, telephone, smartphone, wireless data port, augmented or virtual reality headset, or any other suitable computing device. In an embodiment, one or more users may be associated with planning interface system 110 and archiving system 120. In the same or another embodiment, one or more users may be associated with planning and execution system 130 and one or more supply chain entities 140.

In one embodiment, planning interface system 110 may be coupled with network 160 using more communication link 162, which may be any wireline, wireless, or other link suitable to support data communications between planning interface system 110 and network 160 during operation of supply chain network 100. Archiving system 120 may be coupled with network 160 using communication link 164, which may be any wireline, wireless, or other link suitable to support data communications between archiving system 120 and network 160 during operation of supply chain network 100. Planning and execution system 130 may be coupled with network 160 using communication link 166, which may be any wireline, wireless, or other link suitable to support data communications between planning and execution system 130 and network 160 during operation of supply chain network 100. One or more supply chain entities 140 may be coupled with network 160 using communication link 168, which may be any wireline, wireless, or other link suitable to support data communications between one or more supply chain entities 140 and network 160 during operation of supply chain network 100. One or more computers 150 may be coupled with network 160 using communication link 170, which may be any wireline, wireless, or other link suitable to support data communications between one or more computers 150 and network 160 during operation of supply chain network 100. Although communication links 162-170 are illustrated as generally coupling planning interface system 110, archiving system 120, planning and execution system 130, one or more supply chain entities 140, and one or more computers 150 to network 160, any of planning interface system 110, archiving system 120, planning and execution system 130, one or more supply chain entities 140, and one or more computers 150 may communicate directly with each other, according to particular needs.

In another embodiment, network 160 includes the Internet and any appropriate local area networks (LANs), metropolitan area networks (MANs), or wide area networks (WANs) coupling planning interface system 110, archiving system 120, planning and execution system 130, one or more supply chain entities 140, and one or more computers 150. For example, data may be maintained locally to, or externally of, planning interface system 110, archiving system 120, planning and execution system 130, one or more supply chain entities 140, and one or more computers 150 and made available to one or more associated users of planning interface system 110, archiving system 120, planning and execution system 130, one or more supply chain entities 140, and one or more computers 150 using network 160 or in any other appropriate manner. For example, data may be maintained in a cloud database at one or more locations external to planning interface system 110, archiving system 120, planning and execution system 130, one or more supply chain entities 140, and one or more computers 150 and made available to one or more associated users of planning interface system 110, archiving system 120, planning and execution system 130, one or more supply chain entities 140, and one or more computers 150 using the cloud or in any other appropriate manner. Those skilled in the art will recognize that the complete structure and operation of network 160 and other components within supply chain network 100 are not depicted or described. Embodiments may be employed in conjunction with known communications networks and other components. Although the disclosed systems and methods are described below primarily in connection with retail demand forecasting solely for the sake of clarity, the systems and methods herein are applicable to other one or more supply chain entities 140.

FIG. 2 illustrates planning interface system 110, archiving system 120, and planning and execution system 130 of FIG. 1 in greater detail, in accordance with an embodiment. Planning interface system 110 may comprise server 112 and database 114, as described above. Although planning interface system 110 is illustrated as comprising a single server 112 and a single database 114, embodiments contemplate planning interface system 110 comprising any suitable number of servers, databases, serverless computing options, or data stores internal to, or externally coupled with, planning interface system 110.

Server 112 of planning interface system 110 comprises data preparation module 202, user interface module 204, polytope analysis module 206, and plan execution module 208. Although server 112 is illustrated and described as comprising a single data preparation module 202, a single user interface module 204, a single polytope analysis module 206, and a single plan execution module 208, embodiments contemplate any suitable number or combination of these located at one or more locations local to, or remote from, planning interface system 110, such as on multiple servers or computers 150 at one or more locations in supply chain network 100.

In an embodiment, data preparation module 202 receives data from archiving system 120, planning and execution systems 130, one or more supply chain entities 140, one or more computers 150, or one or more data storage locations local to, or remote from, supply chain network 100 and planning interface system 110, and prepares the data for use by planning interface system 110, such as by checking the received data for errors and transforming the received data. In embodiments, data preparation module 202 checks received data for errors in range, sign, and/or value and performs statistical analysis to check the quality or the correctness of the received data. Data preparation module 202 may also normalize the received data, drop or delete null values, corrupted values, or blank values within the received data, and/or otherwise prepare the received data for use by planning interface system 110. According to embodiments, data preparation module 202 transforms the received data to normalize, aggregate, and/or rescale the received data to enable direct comparison of received data from different systems within supply chain network 100.

User interface module 204 generates and displays a user interface (UI), such as, for example, a GUI, to display data to users of planning interface system 110 and/or collect input data from users of planning interface system 110, such as data defining assumptions, goals, levers, response plans, or any other data of planning interface system 110. In embodiments, user interface module 204 displays polytope analysis data 216, response plan data 218, or any other data of planning interface system 110 in charts, graphs, histograms, or any other visual representations. In addition, or as an alternative, user interface module 204 may generate non-visual interfaces, such as voice-based virtual assistants, email messages, or other text-based messages, and present data to users of planning interface system 110 and/or collect input data from users of planning interface system 110 over such non-visual interfaces. According to embodiments, user interface module 204 generates and displays one or more GUIs comprising interactive graphical elements for inputting data for use in a polytope or assumption-based analysis. For example, user interface module 204 may display a first GUI configured to enable a user to define an assumption for a particular planning scenario, and upon receiving data defining the assumption from the user, may display a second GUI configured to enable the user to select and prioritize goals for use in the polytope analysis. Continuing the example, user interface module 204 may further generate and display a third GUI configured to enable the user to select one or more levers and adjust parameters of the levers. When user interface module 204 receives the user selection of one or more levers and adjustments of the parameters of the levers from the user, user interface module 204 may generate and display a fourth GUI that includes results of a polytope analysis performed using the data received from the user and that is configured to enable the user to select one or more response plans generated based on the polytope analysis. User interface module 204 may configure GUIs to enable the user to return to a previous screen and adjust previously entered data, as well as change or update any data entered previously on any GUI or screen. In embodiments, user interface module 204 also configures GUIs to enable the user to view and modify various parameters of supply chain network 100 for use in supply chain scenario simulations. Example GUIs that user interface module 204 may generate and display are illustrated and described in further detail below with respect to FIGS. 5-17.

Polytope analysis module 206 performs a polytope analysis or an assumption-based analysis based, at least in part, on one or more assumptions provided by a user. In embodiments, polytope analysis module 206 also utilizes one or more goals and one or more levers to perform the polytope analysis or assumption-based analysis. As described in further detail below, polytope analysis module 206 may bundle one or more assumptions into one or more perspectives associated with a provided assumption. Polytope analysis module 206 may further enumerate all assumption objects and update probabilities associated with assumptions, as well as track the accuracy of the probability, scope, and impact by comparing the actual status of the condition and actual impact with the assumed reality. Although particular examples of assumption validation actions are provided, embodiments contemplate polytope analysis module 206 performing other assumption validation actions throughout planning interface system 110, according to particular needs. In embodiments, during polytope analysis, polytope analysis module 206 generates one or more assumption variants and associated probability coefficients using hierarchical scenario structures of assumption variants. In addition, or as an alternative, polytope analysis module 206 may model the scope and impact of one or more assumption variants. Based, at least in part, on the results of the polytope analysis or the assumption based analysis, polytope analysis module 206 may generate one or more mitigation options for assumption variants and use the one or more mitigation options to build a response plan with recommendations for responding to each of the one or more assumption variants.

Plan execution module 208 executes the response plan generated by polytope analysis module 206. According to embodiments, polytope analysis module 206 may generate multiple response plans, which user interface module 204 may present to the user to enable the user to select one or more response plans for plan execution module 208 to execute. For example, user interface module 204 may detect input from the user selecting a response plan corresponding to a particular polytope analysis, upon which plan execution module 208 executes various operations to automatically execute the response plan selected by the user. In embodiments, the operations that plan execution module 208 executes include, for example, pushing execution instructions to one or more supply chain entities 140, transmitting the response plan to one or more assigned persons, activating one or more parked assumption objects, altering one or more data values associated with an assumption object condition, creating one or more new supply chain planning scenarios, and/or applying a mitigation response to one or more sets of planning data. Plan execution module 208 may utilize one or more pieces of automated machinery, as described in greater detail above, to perform the various operations to execute the response plan.

Database 114 of planning interface system 110 may comprise one or more databases or other data storage arrangements at one or more locations, local to, or remote from, server 112. In an embodiment, database 114 of planning interface system 110 comprises assumptions data 210, goals data 212, levers data 214, polytope analysis data 216, and response plan data 218. Although database 114 of planning interface system 110 is illustrated and described as comprising assumptions data 210, goals data 212, levers data 214, polytope analysis data 216, and response plan data 218, embodiments contemplate any suitable number or combination of these located at one or more locations local to, or remote from, planning interface system 110, according to particular needs.

In an embodiment, assumptions data 210 comprises data related to or defining one or more assumptions. For the purposes of this disclosure, assumptions may comprise one or more explicit data objects used to capture scope, impact, and one or more optional mitigation actions related to internal or external influencing factors that affect one or more supply chain entities 140 within supply chain network 100. Assumptions may, for example, represent business strategies, contractual agreements, risk, or opportunity, and may originate from various sources where human experts, stakeholders, or digital assistants inform one or more supply chain planners about one or more potential influencing factors. By way of example only and not by way of limitation, creation of an assumption within planning interface system 110 may include a regional planner storing information about expected market growth of a specific product in that region, an account manager informing a supply chain planner that there is a risk of losing a key account, a supplier informing a planner that the supplier must complete a major turnover over a summer break, and a digital assistant component discovering a trend in sales data for a specific product category in a specific region and delivering the trend to a supply chain planner as an analytical insight with a recommendation on the predicted impact (e.g. unexpected growth rate), among other scenarios. Assumptions data 210 may further comprise complex assumptions, such as groups of assumptions that are combined, bundled, clustered, or otherwise aggregated. According to embodiments, user interface module 204 generates and displays a GUI that enables a user to search assumptions data 210 for all assumptions that relate to or partially relate to a particular context, matter, one or more supply chain entities 140, or other supply chain variable. For example, when assumptions data 210 includes an assumption describing an impending large deal closure for a customer in a specific region related to a specific product, searches of assumptions data 210 for the product, the region, and/or the customer may return the assumption describing the impending large deal closure. While an assumption of assumptions data 210 may initially comprise a simple statement or text phrase, planning interface system 110 may modify an assumption over time to include an assumption type (e.g., risk, opportunity, strategy, etc.), confidence level, scope (e.g., what products, regions, customer, network nodes, etc. are impacted), expected timeframe, impact (e.g., what metrics or figures are impacted and by how much), and mitigation (e.g., action plan to resolve constraints or undesirable outcomes), according to various inputs to and outputs of planning interface system 110.

In embodiments, each assumption stored in assumptions data 210 comprises associated description data, scope data, impact data, and mitigation data. Description data may describe the assumption using a short text phrase, such as, for example, "decreased win rate in deals related to product XYZ in Europe due to the entry of a new European competitor." Scope data may comprise one or more tagged assumptions and/or discrete values selected from dimensions, such as product, region, customer, nodes in supply chain network 100, and the like, to define the locality of the impact associated with the assumption with relation to one or more timeframes and/or time windows. One scope data dimension may be tagged as primary (e.g. product XYZ) while other dimensions serve as boundaries (e.g., the specific region of Europe). According to embodiments, scope data may be modeled as a scenario in a multi-dimensional planning book (MDAP) without having any changes implied. Scope data for assumptions may be retrieved from customer-specific master data and stored as assumptions data 210 by data preparation module 202. Impact data may comprise data related to the expected impact of one or more assumptions. For example, impact data may specify the impact according to one or more measures, metrics, and/or business figures from a MDAP, and may specify the relative impact (e.g., percent increase, percent decrease, etc.) and/or the absolute impact (e.g., "zero capacity of Supplier X as Supplier X shuts down for a turn-over"). In embodiments, planning interface system 110 stores impact data as one or more child scenarios diverging from a master scenario. Mitigation data may comprise data simulating the assumption impact for a selected time window and scope and return issues or constraints to be resolved. In some embodiments, planning interface system 110 may define one or more mitigation actions to maintain a range for one or more key process indicators (KPIs) or to resolve constraints. Planning interface system 110 may store each mitigation action plan as a hierarchical child scenario of the impact scenario.

According to embodiments, planning interface system 110 alters assumptions data 210 in response to one or more user inputs via user interface module 204, enabling the user to create different assumptions or assumption variants differing in one or more aspects from the original assumption. In one example, a trend in one region may be an indication for a global trend, in which a worst case scenario may be that the scope affects the entirety of Europe and not specific to one country, but the modeled impact is the same. In another example in which the scope is established, planning interface system 110 may model different assumption variants for impact or alternative mitigation plans. Depending on the aspect of an assumption that is changed or inherited, planning interface system 110 may automatically create new main scenario assumptions or child scenario assumption variants. In embodiments, to review an assumption, the user may list all assumptions for a selected business context (product, region, customer, date, etc.), re-evaluate the confidence level, receive feedback regarding accuracy of the impact model for a long running assumption, resolve new constraints, and/or completely void the assumption when the condition no longer exists (e.g. deal not lost, customer signed renewal).

In embodiments, the life cycle of an assumption may be independent of a specific planning cycle. Planning interface system 110 may park, activate, re-use, continue, disable, and/or archive one or more assumptions, thereby enabling boundaryless planning. When the condition of an assumption is defined as an executable condition, planning interface system 110 may automatically adjust the confidence level (e.g., set the confidence level to 100%) when the condition occurs or does not occur within a certain time window. In some embodiments, the condition of an assumption may be expressed as a machine-executable logical expression which may be monitored and re-evaluated by planning interface system 110. In such embodiments, planning interface system 110 may distribute re-evaluated condition statements to the original author or stakeholders to be verified on a regular basis.

Goals data 212 comprises data related to or defining one or more goals for use in a polytope analysis. Goals data 212 may be based on user input captured by user interface module 204 while initiating or refining a polytope analysis or an assumption-based analysis. In embodiments, polytope analysis module 206 performs a polytope analysis to generate response plans that optimally maximize or minimize the selected goals. By way of example only and not by way of limitation, possible goals may include minimizing carbon footprint of supply chain plans, minimizing cost to serve for one or more items and/or one or more supply chain entities 140 of supply chain network 100, maximizing demand for one or more items of supply chain network 100, maximizing gross profit margin for supply chain network 100, minimizing on-hand inventory for one or more items of supply chain network 100, maximizing margin for supply chain network 100, maximizing service level agreement performance for supply chain network 100, and minimizing stock violations for supply chain network 100. Although particular examples of goals are provided, embodiments contemplate using or defining other goals, according to particular needs of particular scenarios or assumptions.

Levers data 214 comprises data related to or defining one or more levers for use in a polytope analysis. Levers data 214 may be based on user input captured by user interface module 204 while initiating or refining a polytope analysis or an assumption-based analysis. In embodiments, polytope analysis module 206 performs a polytope analysis to generate response plans where levers specify certain options to consider or not consider. Possible levers may include, for example, changing a price for one or more items of supply chain network 100, changing an advertisement spending amount for one or more items of supply chain network 100, changing a target for supply chain network 100, scaling sales forecast for one or more items of supply chain network 100, adding or removing transfer lanes within supply chain network 100, adding or reducing capacity at one or more supply chain entities 140, and adding or removing export or import sources. Although particular examples of levers are provided, embodiments contemplate using or defining other levers, according to particular needs of particular scenarios or assumptions.

Polytope analysis data 216 comprises data used by polytope analysis module 206 in performing a polytope analysis or an assumption-based analysis. In embodiments, polytope analysis data 216 includes supply chain domain and entity specific features data, levels of granularity, horizon data, and/or other data accumulated and stored during the process of carrying out actions within supply chain network 100 and/or generating one or more assumptions. Polytope analysis data 216 may also include data of one or more perspectives generated by bundling individual assumptions and data of one or more assumption variants generated during polytope analysis, including a scope and anticipated impacts for each assumption variant. According to embodiments, polytope analysis data 216 further includes data of one or more mitigation options generated by polytope analysis module 206.

Response plan data 218 comprises data related to or defining one or more response plans generated by polytope analysis module 206 during a polytope analysis or an assumption-based analysis. For example, response plan data 218 may include instructions for human employees or users, including employees or users that are designated as responsible for implementation of a response plan at one or more supply chain entities 140, as well as automated commands for one or more computers 150 or other machinery to automatically move, mark, or otherwise alter equipment, inventory, resources, and the like of supply chain network 100 to implement a response plan. In embodiments, plan execution module 208 uses response plan data 218 to automatically implement a response plan within supply chain network 100.

As discussed above, archiving system 120 comprises server 122 and database 124. Although archiving system 120 is illustrated as comprising a single server 122 and a single database 124, embodiments contemplate any suitable number of servers or databases internal to, or externally coupled with, archiving system 120.

Server 122 of archiving system 120 comprises data retrieval module 220. Although server 122 is illustrated and described as comprising a single data retrieval module 220, embodiments contemplate any suitable number or combination of data retrieval modules located at one or more locations local to, or remote from, archiving system 120, such as on multiple servers or computers 150 at one or more locations in supply chain network 100.

In one embodiment, data retrieval module 220 of archiving system 120 receives historical supply chain data 230 from planning and execution system 130 and one or more supply chain entities 140 and stores received historical supply chain data 230 in archiving system 120 database 124. According to one embodiment, data retrieval module 220 may prepare historical supply chain data 230 for use as training data by checking historical supply chain data 230 for errors and transforming historical supply chain data 230 to normalize, aggregate, and/or rescale historical supply chain data 230 to enable direct comparison of data received from planning and execution system 130, one or more supply chain entities 140, and/or one or more other locations local to, or remote from, archiving system 120. According to embodiments, data retrieval module 220 may receive data from one or more sources external to supply chain network 100, such as, for example, weather data, special events data, social media data, calendar data, and the like, and store the received data as historical supply chain data 230.

Database 124 of archiving system 120 may comprise one or more databases or other data storage arrangements at one or more locations local to, or remote from, server 122. Database 124 of archiving system 120 comprises, for example, historical supply chain data 230. Although database 124 of archiving system 120 is illustrated and described as comprising historical supply chain data 230, embodiments contemplate any suitable number or combination of data located at one or more locations local to, or remote from, archiving system 120, according to particular needs.

Historical supply chain data 230 comprises historical data received from planning interface system 110, planning and execution system 130, one or more supply chain entities 140, and/or one or more computers 150. Historical supply chain data 230 may comprise, for example, weather data, special events data, social media data, calendar data, and the like. In an embodiment, historical supply chain data 230 may comprise, for example, historic sales patterns, prices, promotions, weather conditions, and other factors influencing future demand of the number of one or more items sold in one or more stores over a time period, such as, for example, one or more days, weeks, months, or years, including, for example, a day of the week, a day of the month, a day of the year, a week of the month, a week of the year, a month of the year, special events, paydays, and the like.

As discussed above, planning and execution system 130 comprises server 132 and database 134. Although planning and execution system 130 is illustrated as comprising a single server 132 and a single database 134, embodiments contemplate any suitable number of servers or databases internal to, or externally coupled with, planning and execution system 130.

In embodiments, server 132 of planning and execution system 130 comprises planning module 240 and prediction module 242. Although server 132 is illustrated and described as comprising a single planning module 240 and a single prediction module 242, embodiments contemplate any suitable number or combination of planning modules and prediction modules located at one or more locations local to, or remote from, planning and execution system 130, such as on multiple servers or computers 150 at one or more locations in supply chain network 100.

Planning module 240 of planning and execution system 130 works in connection with prediction module 242 to generate a plan based on one or more predicted retail volumes, classifications, or other predictions. By way of example and not of limitation, planning module 240 may comprise a demand planner that generates a demand forecast for one or more supply chain entities 140. Planning module 240 may generate the demand forecast, at least in part, from predictions and calculated factor values for one or more causal factors received from prediction module 242. By way of a further example, planning module 240 may comprise an assortment planner and/or a segmentation planner that generates product assortments that match causal effects calculated for one or more customers or products by prediction module 242, which may provide for increased customer satisfaction and sales, as well as reduce costs for shipping and stocking products at stores where they are unlikely to sell.

Prediction module 242 of planning and execution system 130 applies samples of transaction data 250, supply chain data 252, product data 254, inventory data 256, capacity data 258, store data 260, customer data 262, demand forecasts 264, and other data to prediction models 268 to generate predictions and calculated factor values for one or more causal factors. Prediction module 242 of planning and execution system 130 may predict a volume Y (target) from a set of causal factors X along with causal factors strengths that describe the strength of each causal factor variable contributing to the predicted volume. According to some embodiments, prediction module 242 generates predictions at daily intervals. However, embodiments contemplate longer and shorter prediction phases that may be performed, for example, weekly, twice a week, twice a day, hourly, or the like.

Database 134 of planning and execution system 130 may comprise one or more databases or other data storage arrangements at one or more locations local to, or remote from, server 132. Database 134 of planning and execution system 130 comprises, for example, transaction data 250, supply chain data 252, product data 254, inventory data 256, capacity data 258, store data 260, customer data 262, demand forecasts 264, supply chain models 266, and prediction models 268. Although database 134 of planning and execution system 130 is illustrated and described as comprising transaction data 250, supply chain data 252, product data 254, inventory data 256, capacity data 258, store data 260, customer data 262, demand forecasts 264, supply chain models 266, and prediction models 268, embodiments contemplate any suitable number or combination of data located at one or more locations local to, or remote from, planning and execution system 130, according to particular needs.

Transaction data 250 of planning and execution system 130 may comprise recorded sales and returns transactions and related data, including, for example, a transaction identification, time and date stamp, channel identification (such as stores or online touchpoints), product identification, actual cost, selling price, sales volume, customer identification, promotions, and/or the like. In addition, transaction data 250 is represented by any suitable combination of values and dimensions, aggregated or disaggregated, such as, for example, sales per week, sales per week per location, sales per day, sales per day per season, or the like.

Supply chain data 252 may comprise any data of one or more supply chain entities 140 including, for example, item data, identifiers, metadata (comprising dimensions, hierarchies, levels, members, attributes, cluster information, and member attribute values), fact data (comprising measure values for combinations of members), business constraints, goals, and objectives of one or more supply chain entities 140.

Product data 254 of database 134 may comprise products identified by, for example, a product identifier (such as a Stock Keeping Unit (SKU), Universal Product Code (UPC), or the like) and one or more attributes and attribute types associated with the product ID. Product data 254 may comprise data about one or more products organized and sortable by, for example, product attributes, attribute values, product identification, product components, sales volume, demand forecast, or any stored category or dimension. Attributes of one or more products may be, for example, any categorical characteristic, structural characteristic, or quality of a product, and an attribute value may be a specific value or identity for the one or more products according to the categorical characteristic or quality, including, for example, physical parameters (such as, for example, size, weight, dimensions, color, and the like).

Inventory data 256 of database 134 may comprise any data relating to current or projected inventory quantities or states, order rules, or the like. For example, inventory data 256 may comprise the current level of inventory for each item at one or more stocking points across supply chain network 100. In addition, inventory data 256 may comprise order rules that describe one or more rules or limits on setting an inventory policy, including, but not limited to, a minimum order volume, a maximum order volume, a discount, and a step-size order volume, and batch quantity rules. According to some embodiments, planning and execution system 130 accesses and stores inventory data 256 in database 134, which may be used by planning and execution system 130 to place orders, set inventory levels at one or more stocking points, initiate manufacturing of one or more components, or the like.

In embodiments, inventory data 256 may also comprise one or more inventory policies. The inventory policies may comprise any suitable inventory policy describing the reorder point and target quantity, or other inventory policy parameters that set rules for planning and execution system 130 to manage and reorder inventory. The inventory policies may be based on target service level, demand, cost, fill rate, or the like. According to embodiments, the inventory policies comprise target service levels that ensure that a service level of one or more supply chain entities 140 is met with a set probability. For example, one or more supply chain entities 140 may set a service level at 95%, meaning one or more supply chain entities 140 sets the desired inventory stock level at a level that meets demand 95% of the time. Although a particular service level target and percentage is described, embodiments contemplate any service target or level, such as, for example, a service level of approximately 99% through 90%, a 75% service level, or any suitable service level, according to particular needs. Other types of service levels associated with inventory quantity or order quantity may comprise, but are not limited to, a maximum expected backlog and a fulfillment level. Once the service level is set, planning and execution system 130 may determine a replenishment order according to one or more replenishment rules, which, among other things, indicates to one or more supply chain entities 140 to determine or receive inventory to replace the depleted inventory. By way of example only and not by way of limitation, an inventory policy for non-perishable goods with linear holding and shorting costs comprises a min./max. (s,S) inventory policy. Other inventory policies may be used for perishable goods, such as fruit, vegetables, dairy, and fresh meat, as well as electronics, fashion, and similar items for which demand drops significantly after a next generation of electronic devices or a new season of fashion is released.

Capacity data 258 of database 134 may comprise any data relating to current or projected resource capacity values or states, order rules, or the like. For example, capacity data 258 may comprise the current level of capacity for each task at one or more locations across supply chain network 100. In addition, capacity data 258 may comprise order rules that describe one or more rules or limits on setting a capacity policy, including, but not limited to, a minimum order capacity, a maximum order capacity, a discount, a step-size order capacity, and batch quantity rules. According to some embodiments, planning and execution system 130 accesses and stores capacity data 258 in database 134, which may be used by planning and execution system 130 to place orders, set capacity levels at one or more locations in supply chain network 100, initiate manufacturing of one or more components, or the like.

In embodiments, capacity data 258 may include one or more capacity policies. The capacity policies may comprise any suitable capacity policy describing the reorder point and target quantity, or other capacity policy parameters that set rules for planning and execution system 130 to manage capacity. The capacity policies may be based on target service level, demand, cost, or the like. According to embodiments, the capacity policies comprise target service levels that ensure that a service level of one or more supply chain entities 140 is met with a set probability. For example, one or more supply chain entities 140 may set a service level at 95%, meaning one or more supply chain entities 140 sets the desired capacity level at a level that meets demand 95% of the time.

Store data 260 may comprise data describing the stores of one or more retailers and related store information. Store data 260 may comprise, for example, a store ID, store description, store location details, store location climate, store type, store opening date, lifestyle, store area (expressed in, for example, square feet, square meters, or other suitable measurement), latitude, longitude, and other similar data.

Customer data 262 of planning and execution system 130 may comprise customer identity information, including, for example, customer relationship management data, loyalty programs, and mappings between product purchases and one or more customers so that a customer associated with a transaction may be identified. Customer data 262 may further comprise data relating customer purchases to one or more products, geographical regions, store locations, or other types of dimensions. In an embodiment, customer data 262 may also comprise customer profile information, including demographic information and preferences, as well as product browsing data, customer service interaction data, and UI analytics data of customers.

Demand forecasts 264 of database 134 may indicate expected future demand based on, for example, any data relating to past sales, past demand, purchase data, promotions, events, or the like of one or more supply chain entities 140. Demand forecasts 264 may cover a time interval such as, for example, by the minute, by the hour, daily, weekly, monthly, quarterly, yearly, or any other suitable time interval, including substantially in real time. In some embodiments, demand may be modeled as a negative binomial or Poisson-Gamma distribution. According to other embodiments, the model also takes into account shelf-life of perishable goods (which may range from days (e.g., fresh fish or meat) to weeks (e.g., butter) or even months, before any unsold items have to be written off as waste) as well as influences from promotions, price changes, rebates, coupons, and even cannibalization effects within an assortment range. In addition, customer behavior is not uniform but varies throughout the week and is influenced by seasonal effects and the local weather, as well as many other contributing factors. Accordingly, even when demand generally follows a Poisson-Gamma model, the exact values of the parameters of the model may be specific to a single product to be sold on a specific day in a specific location or sales channel and may depend on a wide range of frequently changing influencing causal factors. By way of example only and not by way of limitation, an exemplary supermarket may stock twenty thousand items at one thousand locations. When each location of this exemplary supermarket is open every day of the year, planning and execution system 130 needs to calculate approximately $2 \times 10^{10}$ demand forecasts 264 each day to derive the optimal order volume for the next delivery cycle (e.g., three days).

Supply chain models 266 of database 134 comprise characteristics of a supply chain setup to deliver the customer expectations of a particular customer business model. These characteristics may comprise differentiating factors, such as, for example, MTO (Make-to-Order), ETO (Engineer-to-Order), or MTS (Make-to-Stock). However, supply chain models 266 may also comprise characteristics that specify the supply chain structure in even more detail, including, for example, specifying the type of collaboration with the customer (e.g., Vendor-Managed Inventory (VMI)), from where products may be sourced, and how products may be allocated, shipped, or paid for by particular customers. Each of these characteristics may lead to a different supply chain model. Prediction models 268 comprise one or more of the trained models used by planning and execution system 130 for predicting, among other variables, pricing, targeting, or retail volume, such as, for example, a forecasted demand volume for one or more products at one or more stores of one or more retailers based on the prices of the one or more products.

Figure 3:
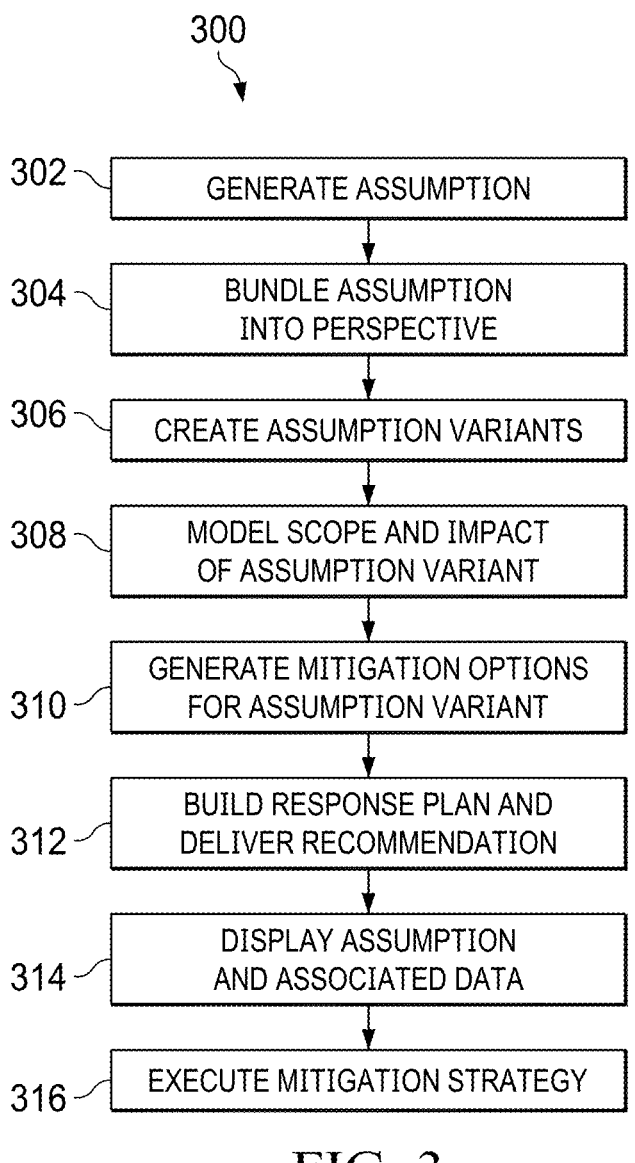
FIG. 3 illustrates a method for executing mitigation strategies based on generated assumptions, in accordance with an embodiment.

FIG. 3 illustrates method 300 for executing mitigation strategies based on generated assumptions, in accordance with an embodiment. Method 300 may be performed by a planning interface system, such as planning interface system 110 of FIG. 1. The method proceeds by one or more activities, which although described in a particular order, may be performed in one or more permutations, combinations, orders, or repetitions, according to particular needs.

At activity 302, user interface module 204 of planning interface system 110 receives one or more assumptions via a GUI displayed by, for example, one or more output devices 154 of one or more computers 150. In embodiments, user interface module 204 stores the received assumptions as assumptions data 210 of planning interface system 110. As disclosed above, assumptions data 210 may specify any configuration of assumptions and any data associated with each assumption, including, but not limited to, description data, scope data, impact data, and/or mitigation data for each assumption.

At activity 304, data preparation module 202 of planning interface system 110 bundles the one or more assumptions received at activity 302 into one or more perspectives. In embodiments, a perspective, comprising a combination of assumptions, assembles a point of view of a subject, matter, scenario, supply chain entity, and/or other variable that comprises multiple situations, possibilities, and/or perspectives. In one example, data preparation module 202 may combine all risks into a pessimistic perspective and all opportunities into an optimistic perspective, providing for planning boundaries according to pessimistic or optimistic outcomes. In another example, data preparation module 202 may bundle all contractual agreements with a large retailer into one perspective managed as one package of assumptions. Data preparation module 202 may model and park perspectives and/or component assumptions to prepare for potential business scenarios such as pandemics, regional disasters, or international trade issues. As described in further detail below, upon meeting a condition triggering the activation of the perspective, polytope analysis module 206 of planning interface system 110 may activate a large set of assumptions, which may trigger one or more mitigation plans. By way of example only and not by way of limitation, when an assumption comprises an impact and mitigation model, polytope analysis module 206 may re-evaluate the accuracy of the impact model and notify one or more supply chain planners when the assumed impact does not match reality, which may enable more accurate review of actual performance as a result of reviewing the underlying assumptions instead of the planning values that are the result of the assumptions. As an alternative, method 300 may proceed from activity 302 directly to activity 306 when data preparation module 202 does not bundle one or more assumptions into one or more perspectives.

At activity 306, polytope analysis module 206 creates one or more assumption variants. According to embodiments, polytope analysis module 206 generates one or more assumption variants based off an assumption stored in assumptions data 210. For example, when an assumption is that a particular customer (Customer X) is going to order 10,000 units of a particular product (Product Y) during the summer of 2021, assumption variants based on the assumption may include separate variants in which Customer X orders 5,000 units, 10,000, units or 15,000 units of Product Y during the summer of 2021. For each assumption and/or perspective, polytope analysis module 206 may generate a hierarchical scenario structure of multiple assumption variants, wherein each assumption variant is a child scenario of the original assumption on which each variant is based. In embodiments, polytope analysis module 206 also generates one or more probability coefficients for each assumption variant, which specify an estimated likelihood of occurrence of each assumption variant. Continuing with the previous example, polytope analysis module 206 may assign a probability coefficient of 0.05 (indicating a 5% chance) of Customer X ordering 5,000 units during the summer of 2021, a probability coefficient of 0.5 (indicating a 50% chance) of Customer X ordering 10,000 units, and a probability coefficient of 0.45 (indicating a 45% chance) of Customer X ordering 15,000 units.

At activity 308, polytope analysis module 206 models the scope and impact of each assumption variant. Based, at least in part, on the assumption variants and hierarchical scenario structures created at activity 306, polytope analysis module 206 may model the scope of one or more products, one or more supply chain entities 140, and/or one or more other supply chain variables that may be affected by each assumption variant, and may generate one or more impact scenarios for each assumption variant according to the modeled scope. Continuing with the example of Customer X above, polytope analysis module 206 may derive the impact of Customer X ordering 15,000 units of Product Y (5,000 units in excess of the original assumption of ordering 10,000 units), which may include completely depleting stocks of Product Y throughout supply chain network 100 and may require one or more supply chain entities 140 to manufacture, ship, and stock additional Product Y units to avoid a potential shortfall and lost sales.

At activity 310, polytope analysis module 206 generates one or more mitigation options for each assumption variant. Using the assumption variants and hierarchical scenarios created at activity 306 and the anticipated impacts of each assumption variant modeled at activity 308, polytope analysis module 206 generates one or more mitigation options to resolve negative anticipated impacts and/or to take advantage of positive anticipated impacts. Continuing the previous example, for the assumption variant that predicts Customer X ordering 15,000 of Product Y during the summer of 2021, a mitigation option to accommodate the order of 15,000 units may include ramping up production of Product Y throughout supply chain network 100 to accommodate the order without shortfalls or lost sales.

At activity 312, polytope analysis module 206 builds one or more response plans with one or more recommendations. Polytope analysis module 206 may build the one or more response plans to execute the one or more mitigation options within supply chain network 100, such as via specific instructions to one or more supply chain entities 140, based on the one or more mitigation options generated at activity 310. Continuing the example above, for the assumption variant that predicts Customer X ordering 15,000 units of Product Y during the summer of 2021, polytope analysis module 206 may build a response plan in which manufacturers throughout supply chain network 100 order additional upstream components required to produce Product Y and increase the production of Product Y, such that supply chain network 100 may accommodate the order for 15,000 units of Product Y during the summer of 2021.

At activity 314, user interface module 204 displays the one or more assumptions and associated assumptions data 210, including, for example, perspectives, assumption variants, hierarchical scenario structures, scope, impact, mitigation options, and response plans. In embodiments, user interface module 204 accesses any data stored within database 114 of planning interface system 110 and displays the data on one or more output devices 154 of one or more computers 150.

At activity 316, plan execution module 208 of planning interface system 110 executes one or more response plans. According to embodiments, plan execution module 208 executes the one or more response plans automatically in response to, for example, one or more triggers for action defined in response plan data 218 of planning interface system 110, and pushes the one or more response plans to relevant persons, one or more supply chain entities 140, and/or systems within supply chain network 100 to carry out the actions of the one or more response plans. To activate and implement the one or more response plans in response to one or more observed events, plan execution module 208 may utilize a probabilistic event condition act model. Although a particular method of creating and utilizing assumption objects is described herein, embodiments contemplate planning interface system 110 creating and utilizing assumptions according to any method within any assumption lifecycle methodologies or ecosystems, according to particular needs.

FIG. 4 illustrates method 400 for performing assumption-based planning, in accordance with an embodiment. Method 400 may be performed by a planning interface system, such as planning interface system 110 of FIG. 1. Method 400 proceeds by one or more activities, which although described in a particular order, may be performed in one or more permutations, combinations, orders, or repetitions, according to particular needs.

At activity 402, user interface module 204 of planning interface system 110 generates and displays an assumption creation GUI configured to enable a user to create an assumption for use in a polytope analysis. In embodiments, the assumption creation GUI also enables the user to collaborate and discuss possible assumptions for supply chain planning with one or more other users. For example, the assumption creation GUI may enable the user to send messages, images, or other data to other users to discuss assumptions and goals to use in a polytope analysis. By way of further illustration, an example assumption creation GUI is illustrated, and discussed below, with respect to FIG. 5. At activity 404, user interface module 204 generates and displays a polytope analysis launch GUI configured to enable the user to select various options and parameters for the polytope analysis. By way of example only and not by way of limitation, the polytope analysis launch GUI may enable the user to view selected goals and levers corresponding to an assumption.

At activity 406, user interface module 204 generates and displays a goal selection GUI configured to enable the user to choose goals to use in assumption-based or polytope supply chain planning. For example, the goal selection GUI may enable a user to select and define various goals for polytope analysis. By way of further illustration, an example goal selection GUI is illustrated, and discussed below, with respect to FIG. 6. At activity 408, user interface module 204 updates the goal selection GUI upon receiving input of a selection of one or more goals. User interface module 204 may further enable the user to adjust the order of priority of selected goals and may update the goal selection GUI to reflect received adjustments.

At activity 410, user interface module 204 generates and displays a lever selection GUI configured to enable the user to choose levers to use in assumption-based or polytope supply chain planning. As an example, the lever selection GUI may enable the user to select and define various levers for polytope analysis. By way of further illustration, an example lever selection GUI is illustrated, and discussed below, with respect to FIG. 7. At activity 412, user interface module 204 updates the lever selection GUI upon receiving input of a selection of one or more levers. User interface module 204 may further enable the user to adjust the parameters of selected levers and may update the lever selection GUI to reflect received adjustments. At activity 414, user interface module 204 generates and displays an input adjustment GUI configured to display selected levers and to enable users to toggle the selected levers on or off.

At activity 416, polytope analysis module 206 of planning interface system 110 performs a polytope analysis using the selected goals and levers. Upon completion of the polytope analysis, user interface module 204 may display a new GUI or update a previous GUI, such as the input adjustment GUI, to indicate the completion of the polytope analysis to the user. In embodiments, user interface module 204 may enable the user to select and define new levers and/or goals, or deselect or remove existing levers and/or goals for use in one or more additional polytope analyses via input to the input adjustment GUI. By way of further illustration, example input adjustment GUIs are illustrated, and discussed below, with respect to FIGS. 8A-8B. At activity 418, user interface module 204 generates and displays a polytope analysis summary GUI configured to display a summary of the input to the performed polytope analysis. In embodiments, the polytope analysis summary GUI includes the selected goals and selected levers used in performing the polytope analysis. By way of further illustration, an example analysis summary GUI is illustrated, and discussed below, with respect to FIG. 9.

At activity 420, user interface module 204 generates and displays a response plan GUI configured to display a possible response plan. According to embodiments, polytope analysis module 206 generates one or more response plans when performing the polytope analysis, as discussed in greater detail above. Along with the possible response plan, user interface module 204 may include a summary of the output from the polytope analysis in the response plan GUI. By way of further illustration, an example response plan GUI is illustrated, and discussed below, with respect to FIG. 10. At activity 422, user interface module 204 generates and displays an evaluation GUI configured to display in-depth analysis of the output from the polytope analysis and possible response plan. In embodiments, the evaluation GUI includes various visualizations or graphs of data of planning interface system 110, such as, for example, polytope analysis data 216, response plan data 218, or any other data of database 114. By way of further illustration, an example evaluation GUI is illustrated, and discussed below, with respect to FIG. 11.

Figure 5:
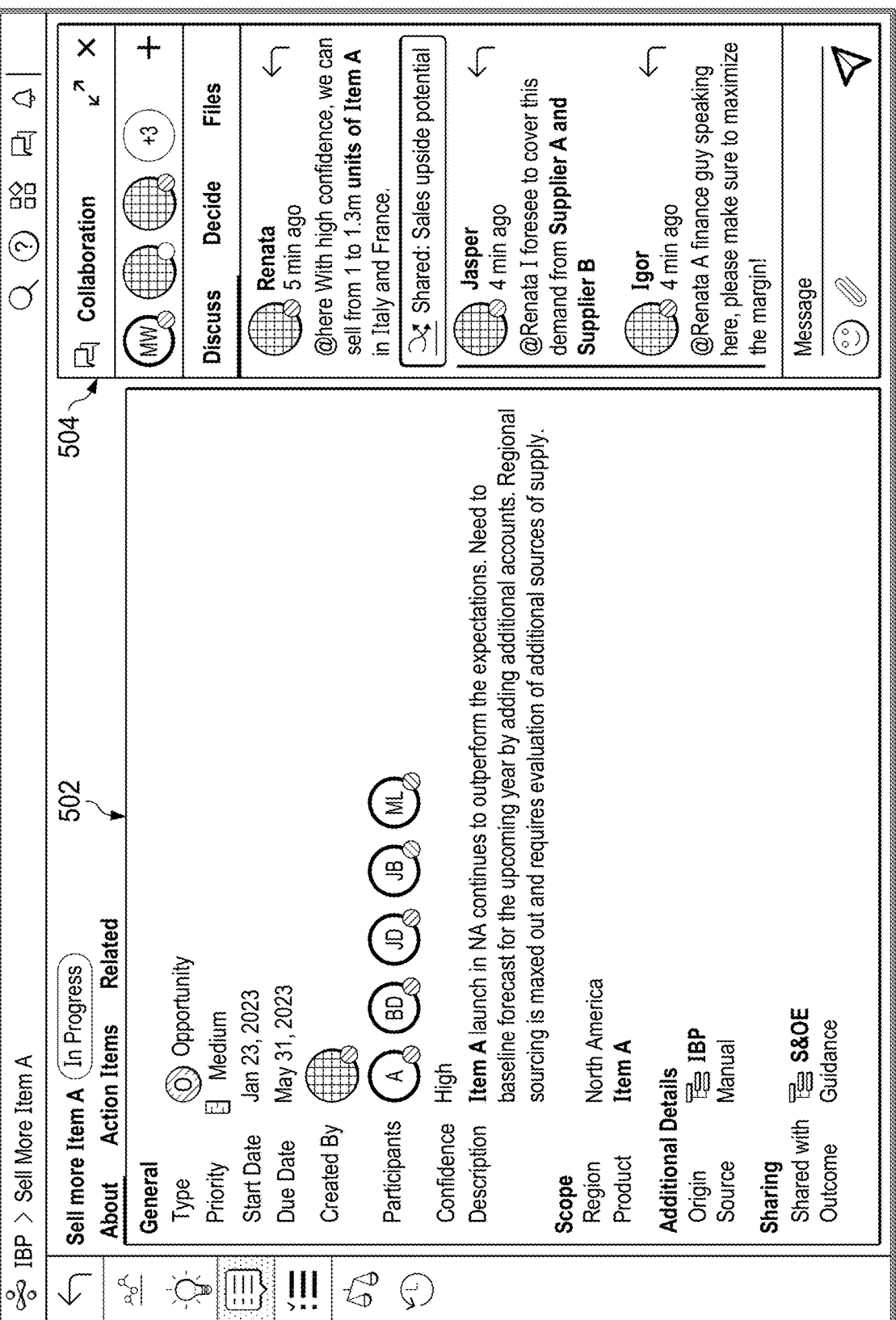
FIG. 5 illustrates an assumption creation graphical user interface, in accordance with an embodiment.

FIG. 5 illustrates assumption creation GUI 500, in accordance with an embodiment. User interface module 204 of planning interface system 110 may generate assumption creation GUI 500 in response to user input and may display assumption creation GUI 500 via one or more output devices associated with supply chain network 100, such as one or more output devices 154 of one or more computers 150. As illustrated, assumption creation GUI 500 comprises summary pane 502 and collaboration pane 504 corresponding to an assumption within supply chain network 100 defined by a user of planning interface system 110. Summary pane 502 comprises various assumption data 210 associated with the assumption, including type (or perspective), priority, relevant dates, creation and sharing data, confidence, description of the assumption, and scope. In this example, the assumption is an opportunity to sell additional volume of a particular product sold within supply chain network 100, "Item A," which has medium priority and a high level of confidence in the assumption. The assumption further has a regional scope of North America and includes the details of the organizational units within supply chain network 100 where the assumption originated and organizations units with which the assumption may be shared. Collaboration pane 504 enables users to comment on various aspects or possibilities of the assumption via, for example, text-based messages, as well as upload files relevant to the assumption or the planning process and make decisions.

Figure 6:
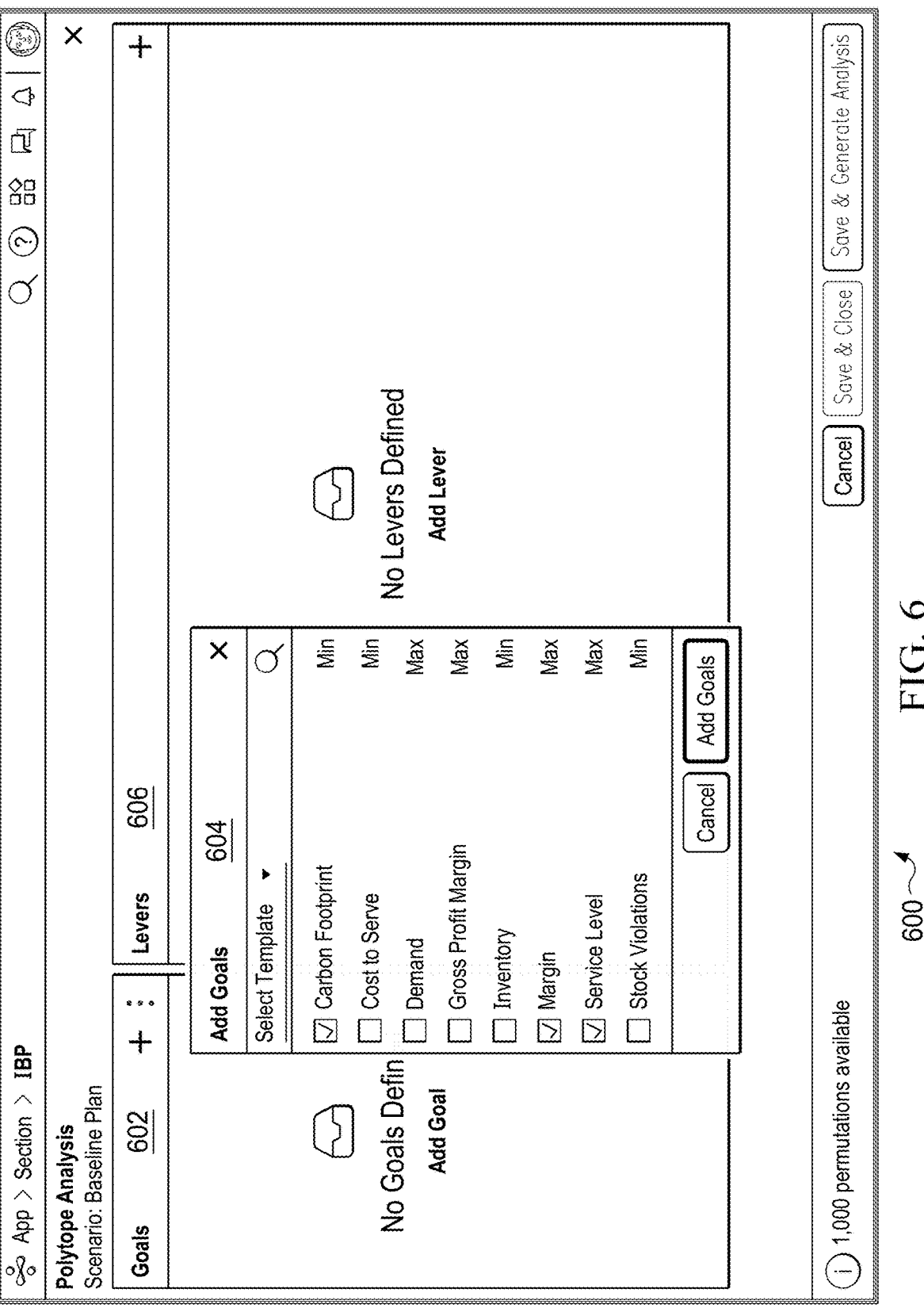
FIG. 6 illustrates a goal selection graphical user interface, in accordance with an embodiment.

FIG. 6 illustrates goal selection GUI 600, in accordance with an embodiment. User interface module 204 of planning interface system 110 may generate goal selection GUI 600 in response to receiving user input and may display goal selection GUI 600 via one or more output devices associated with supply chain network 100, such as one or more output devices 154 of one or more computers 150. As illustrated, goal selection GUI 600 comprises goals pane 602, goal selection pop-out window 604, and levers pane 606. In embodiments, goals pane 602 enables a user to view, select, define, and prioritize goals for an assumption. To add and/or select one or more goals, goals pane 602 may comprise a selectable element configured to display goal selection pop-out window 604 upon user interaction, which enables the user to select existing goal templates, individually select or deselect various goals, and add new goals that are not defined within planning interface system 110. In this example, existing goals configured within planning interface system 110 include minimizing carbon footprint of supply chain plans, minimizing cost to serve for one or more items of supply chain network 100, maximizing demand for one or more items of supply chain network 100, maximizing gross profit margin for supply chain network 100, minimizing inventory for one or more items of supply chain network 100, maximizing margin for supply chain network 100, maximizing service level agreement performance for supply chain network 100, and minimizing stock violations for supply chain network 100. In the example illustrated by FIG. 6, the user has selected goals of minimizing carbon footprint, maximizing margins, and maximizing service level agreement performance. Levers pane 606 enables the user to select one or more levers and view selected levers, as described in further detail with respect to FIG. 7.

Figure 7:
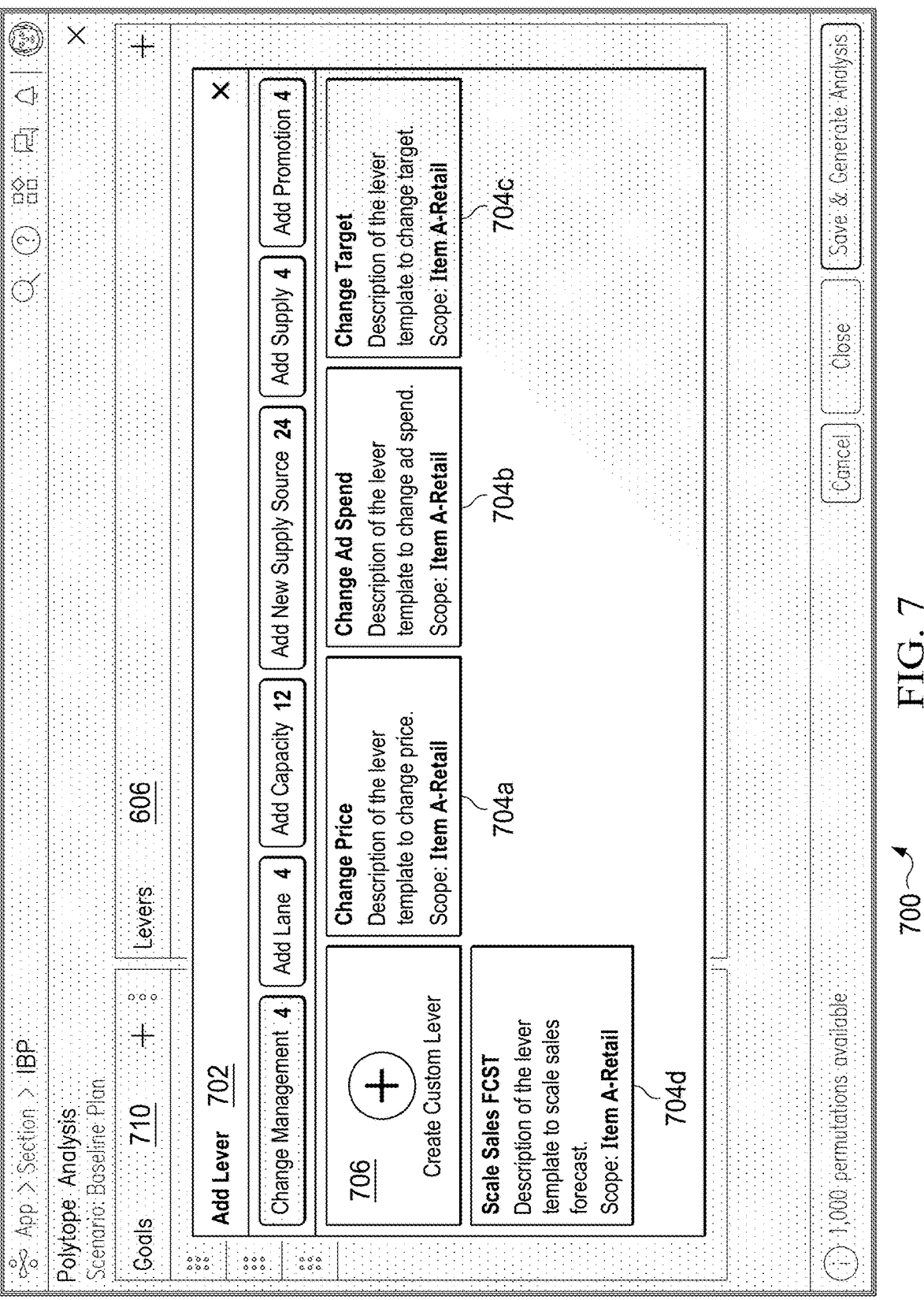
FIG. 7 illustrates a lever selection graphical user interface, in accordance with an embodiment.

FIG. 7 illustrates lever selection GUI 700, in accordance with an embodiment. In embodiments, user interface module 204 of planning interface system 110 generates lever selection GUI 700 in response to user interaction with lever pane 606 of FIG. 6 and displays lever selection GUI 700 via one or more output devices associated with supply chain network 100, such as one or more output devices 154 of one or more computers 150. As illustrated, lever selection GUI 700 comprises lever selection pop-up window 702 over updated goals pane 710 and levers pane 606, which enables the user to select one or more lever templates to add levers to a polytope analysis via selectable elements 704a-704d including a lever template to add a change price lever via selectable element 704a, a lever template to add an ad spend lever via selectable element 704b, a lever template to add a sales target lever via selectable element 704c, and a lever template to add a sales forecast lever via selectable element 704d. Selectable element 706 of lever selection pop-up window 702 enables the user to provide or define other templates, such as, for example, levers based on various metrics, levers to scale prices, levers to add lanes, levers to add capacity, levers to add new supply sources, and levers to add promotions, among various other levers. Updated goals pane 710 displays selected goals to the user, which in this example include margin, service level, and carbon footprint goals, corresponding to the goals selected in goal selection pop-out window 604 of FIG. 6.

Figure 8A:
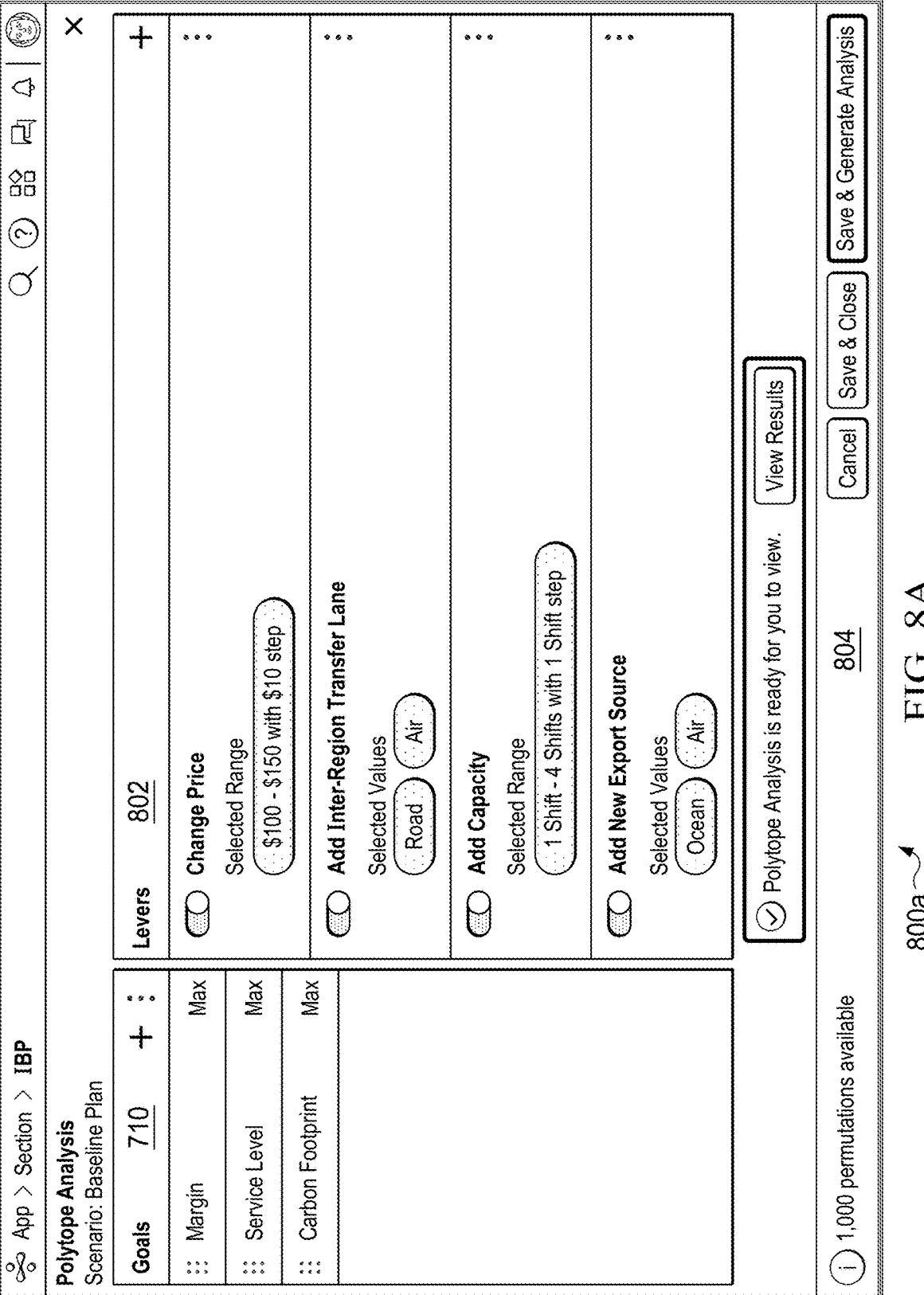
FIGS. 8A-8B illustrate input adjustment graphical user interfaces, in accordance with an embodiment.
Figure 8B:
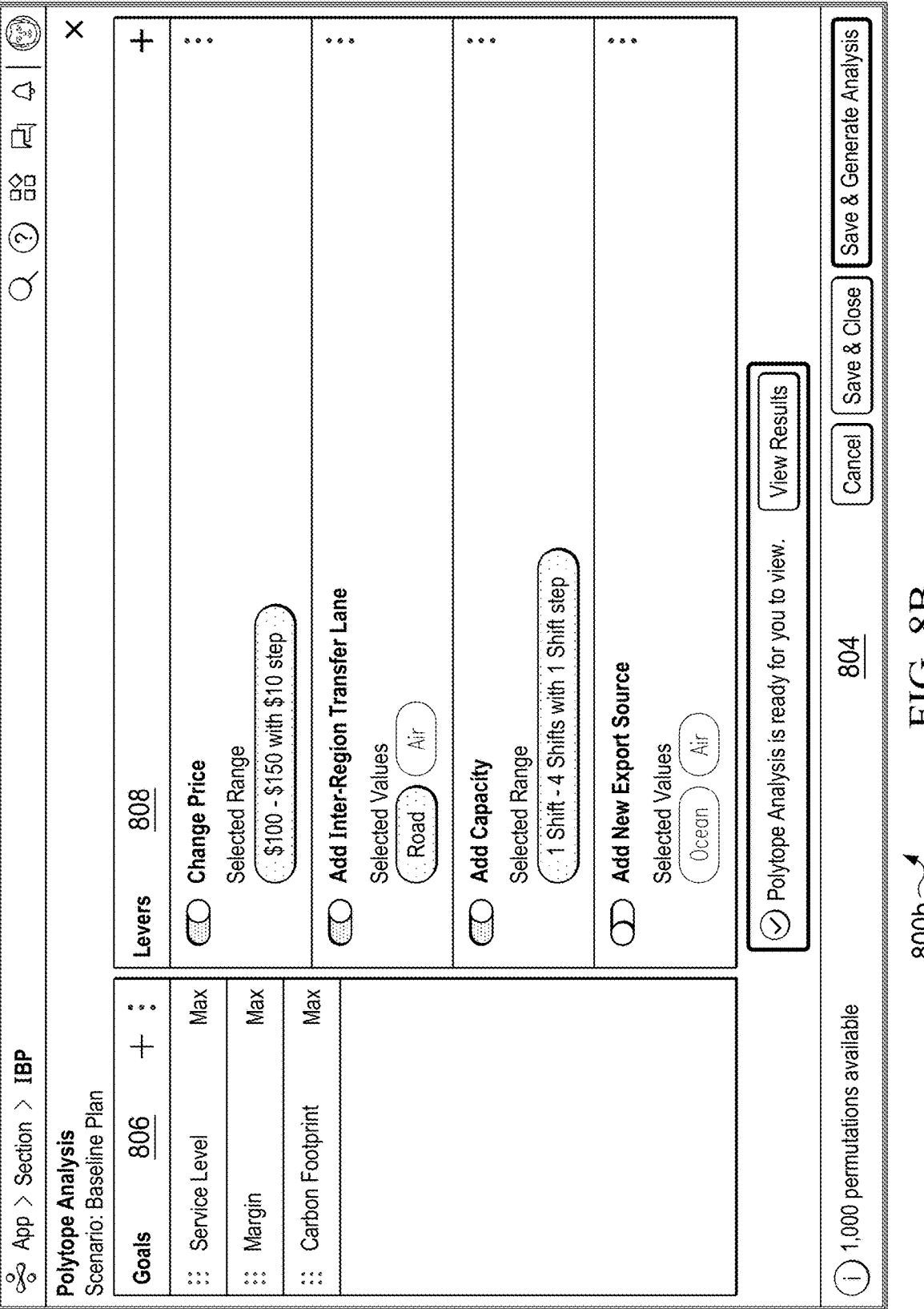

FIGS. 8A-8B illustrate input adjustment GUIs 800a-800b, in accordance with an embodiment. User interface module 204 of planning interface system 110 may generate input adjustment GUI 800a in response to user interaction with lever selection pop-up window 702 of FIG. 7 and may display input adjustment GUI 800a via one or more output devices associated with supply chain network 100, such as one or more output devices 154 of one or more computers 150. In this example, input adjustment GUI 800a comprises updated goals pane 710, updated levers pane 802, and analysis pane 804. Updated levers pane 802 includes four levers selected for use in a polytope analysis based on a particular assumption. In this case, the assumption is in increase in demand for a particular product sold within supply chain network 100, and the levers are changing the price of the product from one hundred dollars to one hundred fifty dollars in ten-dollar steps, adding inter-region transfer lanes of road and air, adding capacity for the product of one to four shifts in one-shift steps, and adding new export sources of ocean and air. Although particular examples of levers are provided, embodiments contemplate using various other levers in the polytope analysis, according to particular needs.

Analysis pane 804 comprises various selectable elements that enable the user to generate, view, and filter a polytope analysis generated by polytope analysis module 206 using the selected goals and levers. In this example, analysis pane 804 illustrates that using the selected levers for the polytope analysis results in one thousand possible permutations or variants of the assumption and response plans. In embodiments, user interface module 204 enables the user to select a number of total permutations or variants to view out of the total permutations generated, such as, for example, a top 10% or top 5% of permutations, although any absolute or percentage value of permutations may be selected. Analysis pane 804 further enables the user to save the goals and levers used in the current polytope analysis, generate the polytope analysis, and view the polytope analysis. According to embodiments, input adjustment GUI 800a enables the user to toggle use of levers via updated levers pane 802, upon which user interface module 204 may generate and display a new GUI according to the particular user interactions, such as, for example, input adjustment GUI 800b.

Input adjustment GUI 800b of FIG. 8B comprises updated goals pane 806, updated levers pane 808, and analysis pane 804, although in other examples input adjustment GUI 800b may comprise an updated analysis pane in the place of analysis pane 804 if user changes to goals and/or levers have resulted in a change to analysis pane 804. In embodiments, user interface module 204 generates input adjustment GUI 800b upon receiving user input modifying the goals and levers illustrated in input adjustment GUI 800a of FIG. 8A and displays input adjustment GUI 800b via one or more output devices associated with supply chain network 100, such as one or more output devices 154 of one or more computers 150. In particular, compared to FIG. 8A, the user has changed the order of the selected goals, illustrated by updated goals pane 806, to prioritize maximation of service level agreement performance above maximization of margin. The user has also deselected the add new export source lever, illustrated by updated levers pane 808. Analysis pane 804 enables the user to generate a new polytope analysis via polytope analysis module 206 using the modified goals and levers. Upon interacting with analysis pane 804 of input adjustment GUI 800a or input adjustment GUI 800b to view the results of a polytope analysis, user interface module 204 may generate one or more analysis summary GUIs, such as analysis summary GUI 900 of FIG. 9.

FIG. 9 illustrates analysis summary GUI 900, in accordance with an embodiment. User interface module 204 of planning interface system 110 may generate analysis summary GUI 900 in response to user interaction with input adjustment GUI 800a of FIG. 8a and may display analysis summary GUI 900 via one or more output devices associated with supply chain network 100, such as one or more output devices 154 of one or more computers 150. As illustrated, analysis summary GUI 900 comprises input summary pane 902, which includes an overview of all input selected by the user for the polytope analysis, such as the goals and levers, as well as navigation pane 904, which enables the user to navigate to one or more other GUIs generated by user interface module 204 in response to the completion of the polytope analysis. In the example illustrated in FIG. 9, the goals displayed in input summary pane 902 include maximizing margin, maximizing service level agreement performance, and minimizing carbon footprint in the order of maximizing margin first, maximizing service level agreement performance second, and minimizing carbon footprint third, corresponding to the selections illustrated in updated goals pane 710 of FIG. 8A. Further, the levers displayed in input summary pane 902 include changing price of the product sold in retail from one hundred dollars to one hundred fifty dollars in ten-dollar steps, adding an inter-region transfer lane of the product from Dallas to Los Angeles and New York via road and air transportation, adding packaging capacity at Facility 1 from one shift to four shifts in single-shift increments, and adding an import/export source from Amsterdam and Osaka to New York, Los Angeles, and Dallas via ocean and air transportation, corresponding to the selections illustrated in updated levers pane 802 of FIG. 8A. Navigation pane 904 comprises various selectable elements to navigate to other GUIs, such as, for example, response plan GUI 1000 of FIG. 10 and evaluation GUI 1100 of FIG. 11.

FIG. 10 illustrates response plan GUI 1000, in accordance with an embodiment. In embodiments, user interface module 204 of planning interface system 110 generates response plan GUI 1000 in response to user interaction with navigation pane 904 of FIG. 9 or FIG. 11 and displays response plan GUI 1000 via one or more output devices associated with supply chain network 100, such as one or more output devices 154 of one or more computers 150. Response plan GUI 1000 of FIG. 10 comprises updated goals pane 710, navigation pane 904, and response plan pane 1002. As illustrated, response plan pane 1002 includes the top three scenarios out of one hundred eighty-six scenarios considered by polytope analysis module 206 for the particular assumption used in the polytope analysis, as well as forecasted metrics for each scenario and a current plan and lever values for each scenario. In this example, the forecasted metrics include demand, revenue, gross profit margin, cost to serve, service level, inventory, and carbon footprint. Although particular metrics are provided as examples, embodiments contemplate planning interface system 110 using any metrics when generating polytope analyses, according to particular needs. In embodiments, response plan GUI 1000 enables the user to review the forecasts and data of the polytope analysis and select a response plan or scenario to implement in response to the assumption, which plan execution module 208 may automatically implement, as described in greater detail above.

Figure 11:
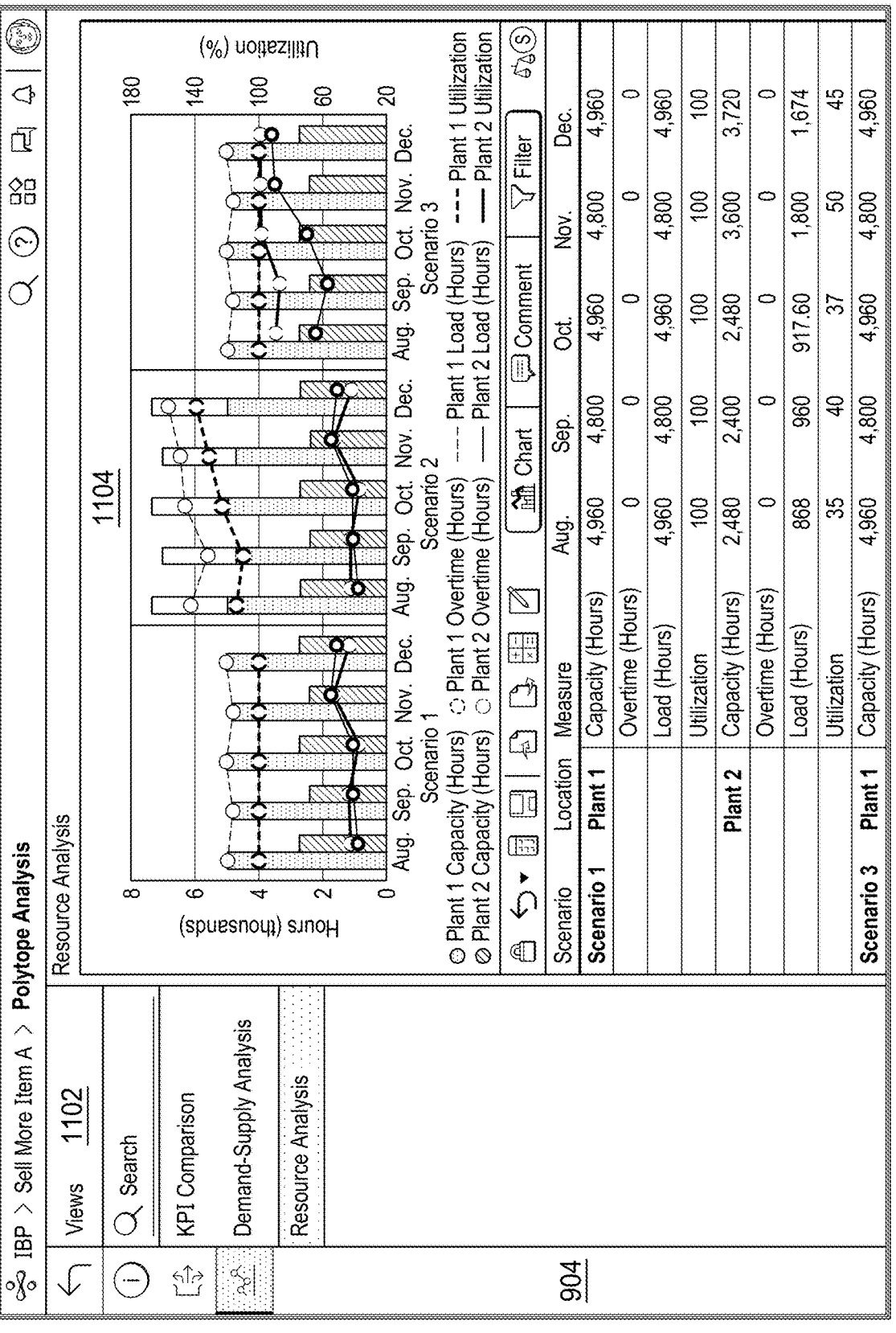
FIG. 11 illustrates an evaluation graphical user interface, in accordance with an embodiment.

FIG. 11 illustrates evaluation GUI 1100, in accordance with an embodiment. User interface module 204 of planning interface system 110 may generate evaluation GUI 1100 in response to user interaction with navigation pane 904 of FIG. 9 or FIG. 10 and may display evaluation GUI 1100 via one or more output devices associated with supply chain network 100, such as one or more output devices 154 of one or more computers 150. As illustrated, evaluation GUI 1100 comprises navigation pane 904, views pane 1102, and evaluation pane 1104. Views pane 1102 enables the user to select various visualizations of comparisons of scenarios generated as results of the polytope analysis to display. In this example, the views include a KPI comparison, a demand-supply analysis, and a resource analysis. Although particular examples of views are illustrated and described with respect to FIG. 11, embodiments contemplate planning interface system 110 providing for any visualizations of comparisons of metrics and other data associated with generated scenarios, according to particular needs. In embodiments, evaluation pane 1104 displays charts, graphs, tables, histograms, and/or other visualizations that enable the user to directly compare scenarios generated by polytope analysis module 206 according to the view selected in views pane 1102. In the example illustrated by FIG. 11, evaluation pane 1104 comprises resource analyses of each of the three scenarios of FIG. 10, corresponding to the selection of the resource analysis view in views pane 1102. The resource analyses include measures of capacity, overtime, load, and utilization for two plants, which enables the user to compare the impact of each scenario on production of Item A. According to embodiments, evaluation pane 1104 further enables the user to toggle various filters and leave comments for collaboration with other users.

Figure 12:
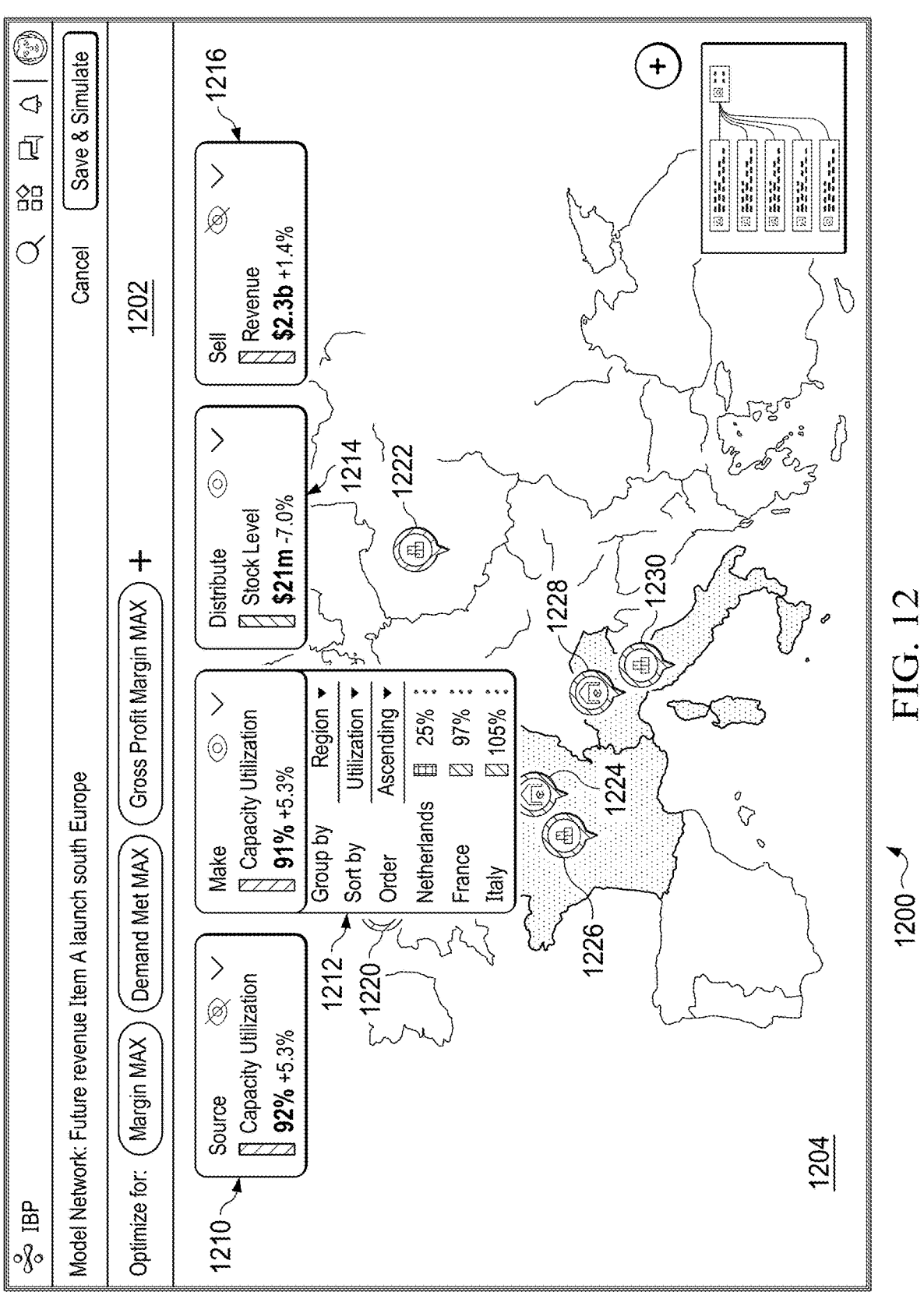
FIG. 12 illustrates a first network modeler graphical user interface, in accordance with an embodiment.

FIG. 12 illustrates first network modeler GUI 1200, in accordance with an embodiment. User interface module 204 of planning interface system 110 may generate first network modeler GUI 1200 in response to user input and may display first network modeler GUI 1200 via one or more output devices associated with supply chain network 100, such as one or more output devices 154 of one or more computers 150. According to embodiments, FIGS. 12-17 illustrate an example series of map interfaces associated with a polytope analysis performed by polytope module 206, which includes an assumption of an opportunity to sell additional volume of a particular product sold within supply chain network 100 with goals of maximizing margin (first priority), maximizing demand met (second priority), and maximizing gross profit margin (third priority). Although the example map interfaces of FIGS. 12-17 are described in a particular order and involve particular user interactions for illustrative purposes, embodiments contemplate one or more permutations and/or combinations of various map interfaces and elements therein, according to particular needs. In this example, first network modeler GUI 1200 comprises information pane 1202, which includes information about the assumption and the goals, and map pane 1204, which includes various KPIs or metrics for a response plan compared to an existing supply chain plan and various interactive elements that enable the user to view additional details of various parameters of the network model, modify various parameters of the network model, and the like.

As illustrated, map pane 1204 includes source window 1210, make window 1212, distribute window 1214, and sell window 1216. In the example of FIG. 12, source window 1210 displays a predicted sourcing capacity utilization of the modeled response plan and relative change in the sourcing capacity utilization from the existing supply chain plan, make window 1212 displays a predicted production capacity utilization of the response plan and relative change in the production capacity utilization from the existing supply chain plan, distribute window 1214 displays a predicted value of stock level of the response plan and relative change in the value of stock level from the existing supply chain plan, and sell window 1216 displays predicted revenue of the response plan and relative change in the revenue from the existing supply chain plan. Although map pane 1204 is illustrated and described as including source window 1210, make window 1212, distribute window 1214, and sell window 1216, embodiments contemplate including any number or combination of windows that display various metrics, KPIs, or other figures, according to particular needs. Each of source window 1210, make window 1212, distribute window 1214, and sell window 1216 further include a selectable element to hide displayed information and a selectable element to expand displayed information. In this case, a user of planning interface system 110 has selected the selectable element to expand displayed information of make window 1212, which displays detailed information about the production capacity utilization and includes the ability to sort and filter the presented data, such as grouping the data by region, sorting the data by utilization level, and ordering the data (e.g., ascending or descending order). Map pane 1204 further comprises node icons 1220-1230, which represent various nodes of one or more supply chain entities 140 of supply chain network 100, as described in further detail below.

Figure 13:
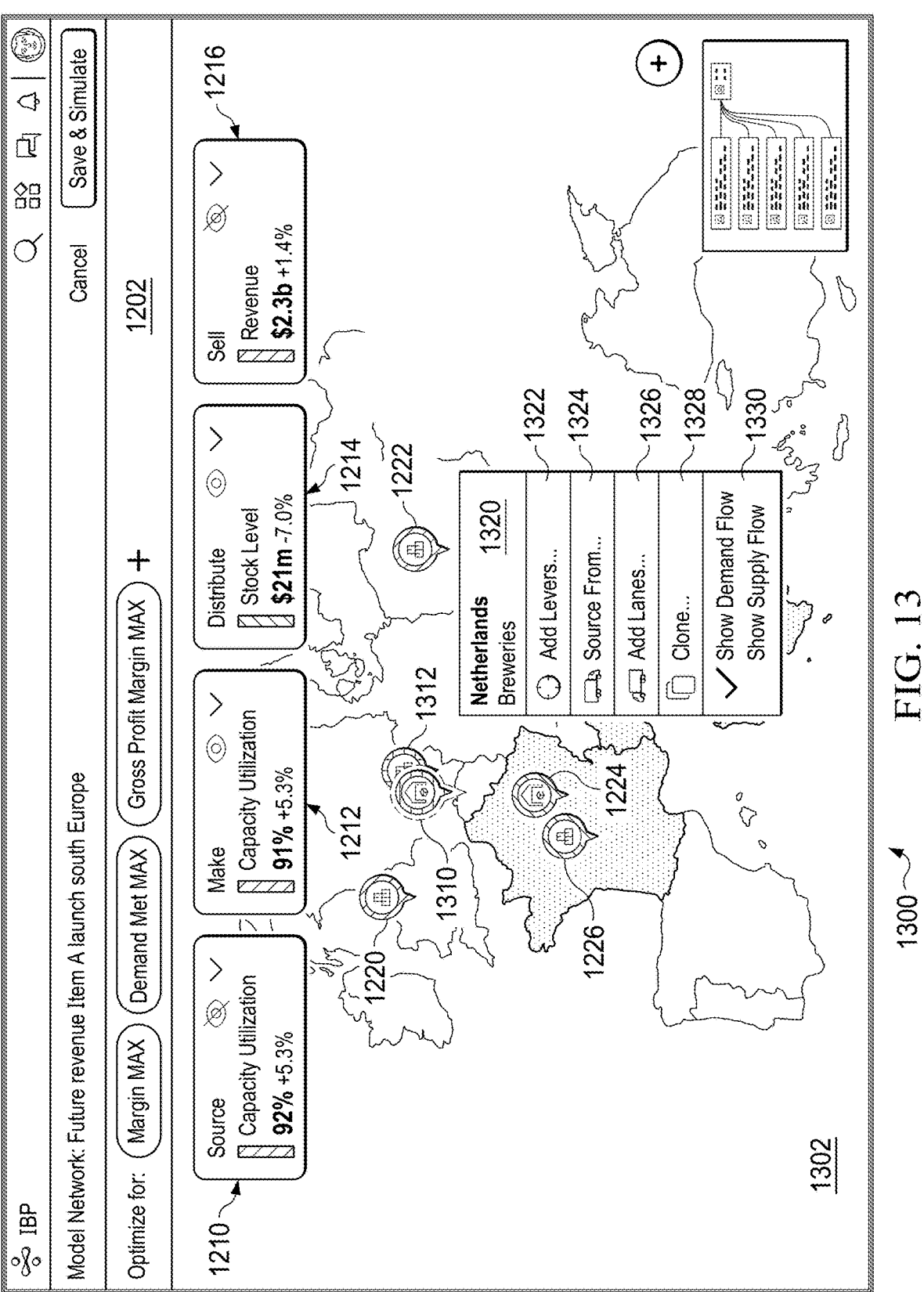
FIG. 13 illustrates a second network modeler graphical user interface, in accordance with an embodiment.

FIG. 13 illustrates second network modeler GUI 1300, in accordance with an embodiment. User interface module 204 of planning interface system 110 may generate second network modeler GUI 1300 in response to user interaction with first network modeler GUI 1200 and may display second network modeler GUI 1300 via one or more output devices associated with supply chain network 100, such as one or more output devices 154 of one or more computers 150. For example, user interface module 204 may generate and display second network modeler GUI 1300 in response to the user selecting a selectable element and/or an icon displayed in map pane 1204 of first network modeler GUI 1200, such as collapsing additional information displayed in make window 1212 via a selectable element and interacting with a particular node icon. As illustrated in FIG. 13, second network modeler GUI 1300 comprises information pane 1202 and map pane 1302, which includes source window 1210, make window 1212, distribute window 1214, sell window 1216, node icons 1220-1226, node icons 1310-1312, and options window 1320.

Node icons 1220-1226 and node icons 1310-1312 represent various nodes of one or more supply chain entities 140 of supply chain network 100, which, when selected, enable the user to view and edit details of the modeled response plan associated with the particular supply chain entity corresponding to the selected node icon. In the example illustrated, the user of planning interface system 110 has selected node icon 1310, corresponding to a Netherlands breweries node, upon which user interface module 204 has displayed options window 1320 associated with node icon 1310. Options window 1320 includes add levers button 1322 (which enables the user to add levers associated with the Netherlands breweries), source from button 1324 (which enables the user to add additional inbound resources or materials to the Netherlands breweries), add lanes button 1326 (which enables the user to add additional outbound distribution routes from the Netherlands breweries), clone button 1328 (which enables the user to copy or clone the node associated with the Netherlands breweries), and view selection toggle buttons 1330 (which enables the user to toggle display of demand flow and supply flow of the modeled response plan).

Figure 14:
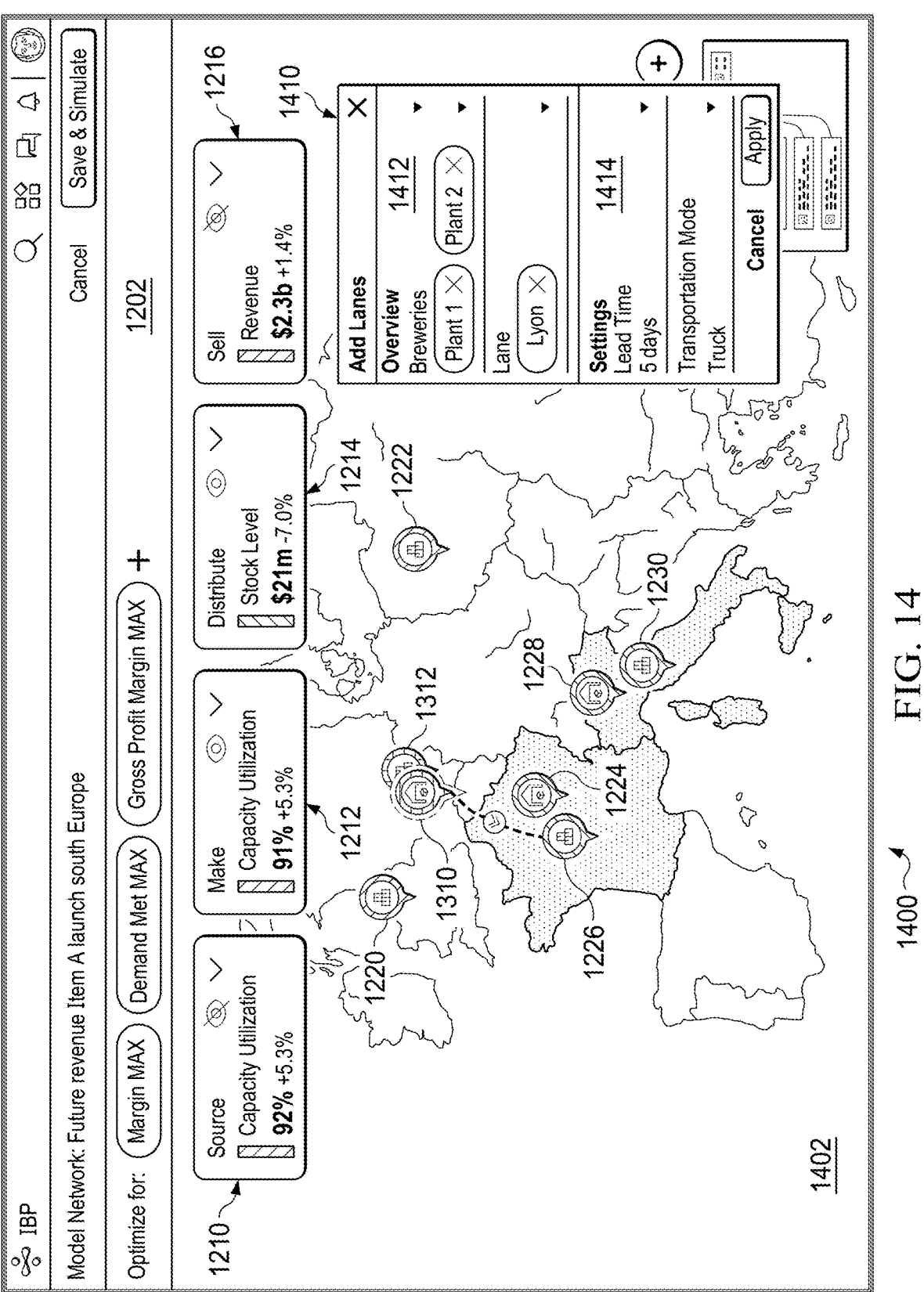
FIG. 14 illustrates a third network modeler graphical user interface, in accordance with an embodiment.

FIG. 14 illustrates third network modeler GUI 1400, in accordance with an embodiment. User interface module 204 of planning interface system 110 may generate third network modeler GUI 1400 in response to user interaction with second network modeler GUI 1300 and may display third network modeler GUI 1400 via one or more output devices associated with supply chain network 100, such as one or more output devices 154 of one or more computers 150. For example, user interface module 204 may generate and display third network modeler GUI 1400 in response to the user selecting add lanes button 1326 of second network modeler GUI 1300. As illustrated, third network modeler GUI 1400 comprises information pane 1202 and map pane 1402, which includes source window 1210, make window 1212, distribute window 1214, sell window 1216, node icons 1220-1230, node icons 1310-1312, and add lanes window 1410.

As disclosed above, node icons 1220-1230 and node icons 1310-1312 represent various nodes of one or more supply chain entities 140 of supply chain network 100, which enable the user to view and edit details of the modeled response plan associated with the particular supply chain entity corresponding to the selected node icon. In the example of FIG. 14, the user of planning interface system 110 has selected node icon 1310, corresponding to the Netherlands breweries node described above with respect to FIG. 13. Add lanes window 1410 of map pane 1402 enables the user to view and modify transportation lanes associated with the Netherlands breweries node, such as adding a lane from the Netherlands breweries node to a different node in supply chain network 100. In embodiments, polytope analysis module 206 of planning interface system 110 analyzes the selected node and overall model of supply chain network 100 to determine parameters to use for add lanes window 1410, such as parameters that are ideal or most likely to be selected by the user according to the performed polytope analysis, and user interface module 204 auto-fills the determined parameters into add lanes window 1410. For example, when polytope analysis module 206 determines a surplus of production at the Netherlands breweries node and a deficit of inventory at a Lyon distribution center node corresponding to node icon 1226, polytope analysis module 206 may determine that the most likely parameters for add lanes window 1410 is to add a lane from one or more plants of the Netherlands breweries node to the Lyon distribution center node. As illustrated by add lanes window 1410, user interface module 204 has auto-filled parameters of source entities of Plant 1 and Plant 2 of the Netherlands breweries and a destination entity of Lyon in overview pane 1412 of add lanes window 1410, as well as parameters of a lead time of five days and a transportation mode of truck in settings pane 1414 of add lanes window 1410. Although particular examples of auto-filled parameters are illustrated and described in this example, user interface module 204 may auto-fill any suitable number or combination of parameters, according to the determined likelihood of input for each parameter and the particular network model. Upon completion of modifying lanes via add lanes window 1410, user interface module 204 may enable the user to return to second network modeler GUI 1300 via one or more selectable elements within add lanes window 1410 to continue viewing or modifying various aspects of the network model.

Figure 15:
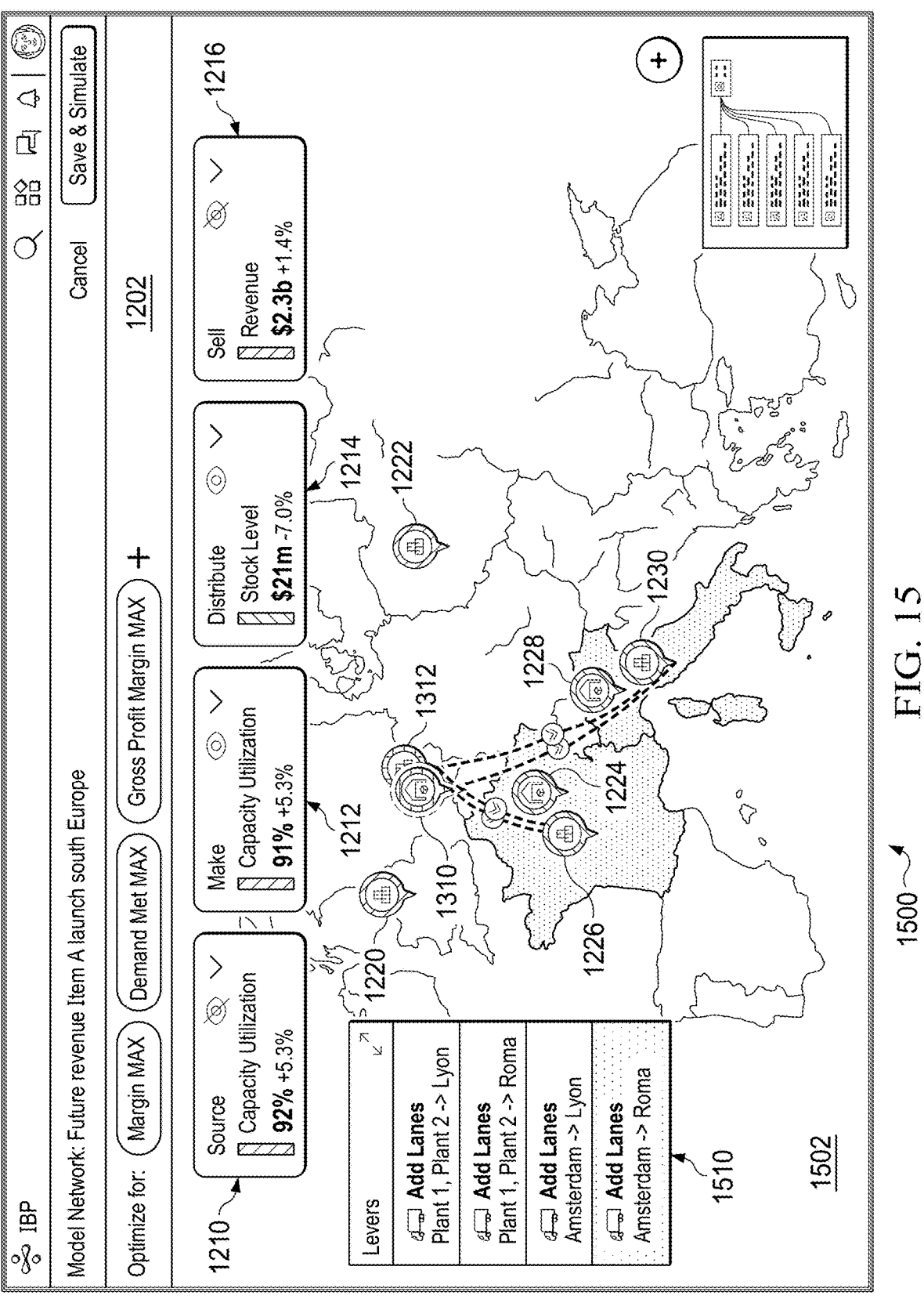
FIG. 15 illustrates a fourth network modeler graphical user interface, in accordance with an embodiment.

FIG. 15 illustrates fourth network modeler GUI 1500, in accordance with an embodiment. User interface module 204 of planning interface system 110 may generate fourth network modeler GUI 1500 in response to user interaction with third network modeler GUI 1400 and may display fourth network modeler GUI 1500 via one or more output devices associated with supply chain network 100, such as one or more output devices 154 of one or more computers 150. For example, user interface module 204 may generate and display fourth network modeler GUI 1500 in response to the user selecting add levers button 1322 after modifying the lanes as illustrated by third network modeler GUI 1400. As illustrated in FIG. 15, fourth network modeler GUI 1500 comprises information pane 1202 and map pane 1502, which includes source window 1210, make window 1212, distribute window 1214, sell window 1216, node icons 1220-1230, node icons 1310-1312, and levers window 1510.

In this example, levers window 1510 displays four levers that have been added by the user of planning interface system 110, in particular, adding a lane from Plant 1 and Plant 2 to Lyon (node icon 1310 to node icon 1226), a lane from Plant 1 and Plant 2 to Roma (node icon 1310 to node icon 1230), a lane from Amsterdam to Lyon (node icon 1312 to node icon 1226), and a lane from Amsterdam to Roma (node icon 1312 to 1230). Although levers of added lanes are illustrated and described with respect to FIG. 15, in other embodiments, levers window 1510 may include various other levers, such as changing price, adding inter-region transfer lanes, adding capacity, adding new import/export sources, or any other levers, as described in greater detail above. Levers window 1510 also enables the user to view details of levers, highlight changes made by levers, and delete or modify levers.

Figure 16:
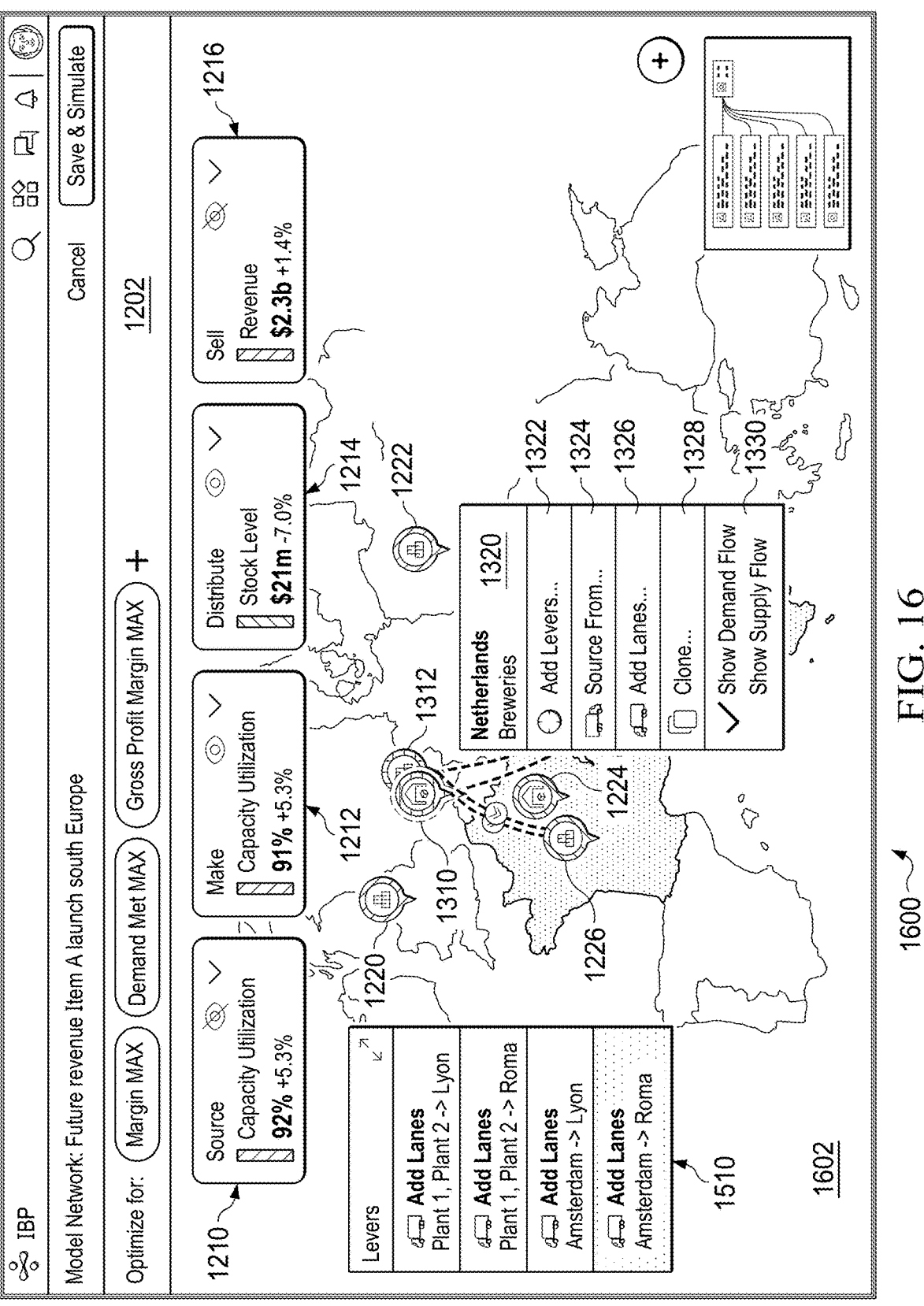
FIG. 16 illustrates a fifth network modeler graphical user interface, in accordance with an embodiment.

FIG. 16 illustrates fifth network modeler GUI 1600, in accordance with an embodiment. User interface module 204 may generate fifth network modeler GUI 1600 in response to user interaction with fourth network modeler GUI 1500 and may display fifth network modeler GUI 1600 via one or more output devices associated with supply chain network 100, such as one or more output devices 154 of one or more computers 150. For example, user interface module 204 may generate and display fifth network modeler GUI 1600 in response to the user selecting a particular node icon of map pane 1502 of FIG. 15, such as node icon 1310. As illustrated, fifth network modeler GUI 1600 comprises information pane 1202 and map pane 1602, which includes source window 1210, make window 1212, distribute window 1214, sell window 1216, node icons 1220-1230, node icons 1310-1312, options window 1320, and levers window 1510. In the example of FIG. 16, map pane 1602 enables the user to make additional modifications to the network model displayed in map pane 1602 via options window 1320, such as via add levers button 1322, source from button 1324, add lanes button 1326, clone button 1328, and view selection toggle buttons 1330, while viewing the levers previously added via levers window 1510. Upon receiving user input to make such additional modifications, user interface module 204 a new GUI to facilitate the additional modifications.

Figure 17:
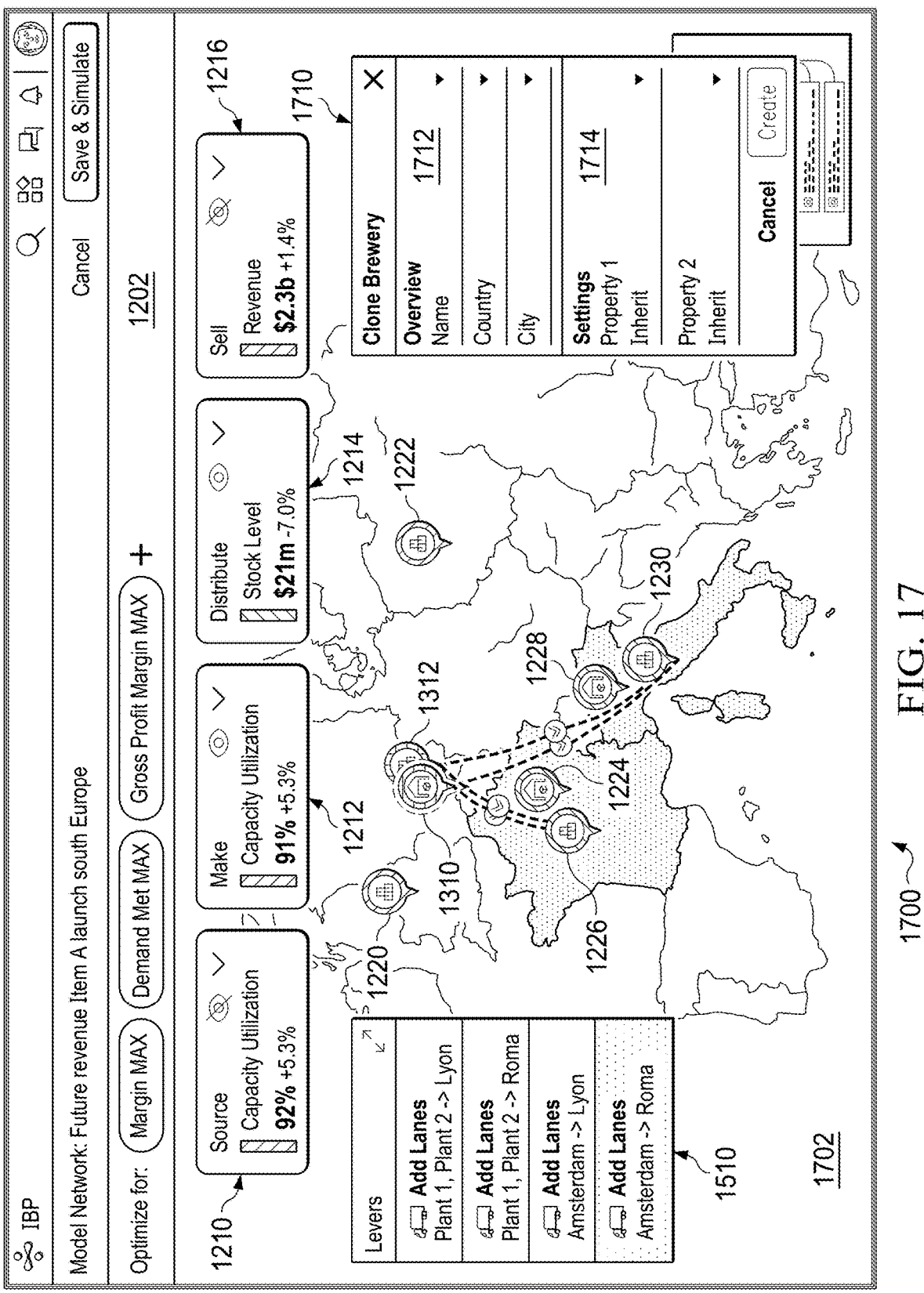
FIG. 17 illustrates a sixth network modeler graphical user interface, in accordance with an embodiment.

FIG. 17 illustrates sixth network modeler GUI 1700, in accordance with an embodiment. User interface module 204 of planning interface system 110 may generate sixth network modeler GUI 1700 in response to user interaction with fifth network modeler GUI 1600 and may display sixth network modeler GUI 1700 via one or more output devices associated with supply chain network 100, such as one or more output devices 154 of one or more computers 150. For example, user interface module 204 may generate and display sixth network modeler GUI 1700 in response to the user selecting clone button 1328 of fifth network modeler GUI 1600. As illustrated in FIG. 17, sixth network modeler GUI 1700 comprises information pane 1202 and map pane 1702, which includes source window 1210, make window 1212, distribute window 1214, sell window 1216, node icons 1220-1230, node icons 1310-1312, levers window 1510, and clone window 1710.

In this example, clone window 1710 of map pane 1702 enables the user to enter information needed to clone the node corresponding to node icon 1310. Although clone window 1710 enables the user to clone a brewery, embodiments contemplate user interface module 204 generating and displaying clone windows to clone any of one or more supply chain entities 140, such as distribution centers, manufacturers, retailers, and the like. According to embodiments, user interface module 204 automatically populates sections of clone window 1710 with information inherited from the starting or parent node. In this case, user interface module 204 has automatically populated a Property 1 and a Property 2 input selector in settings pane 1714 with information of the Netherlands breweries node corresponding to node icon 1310 of map pane 1702 and has left the information of overview pane 1712 to be filled in by the user.

In embodiments, upon completion of modifications to the network model displayed by FIGS. 12-17, polytope analysis module 206 performs a polytope analysis according to the updated parameters of the network model, as described in greater detail above. Although particular examples of various components and parameters of supply chain network 100 are illustrated and described with respect to FIGS. 12-17, embodiments contemplate planning interface system 110 generating and displaying GUIs that are configured to enable users to view and modify any structure of supply chain network 100 comprising any suitable components and parameters for use in assumption-based or polytope supply chain planning, according to particular needs.

Figure 18:
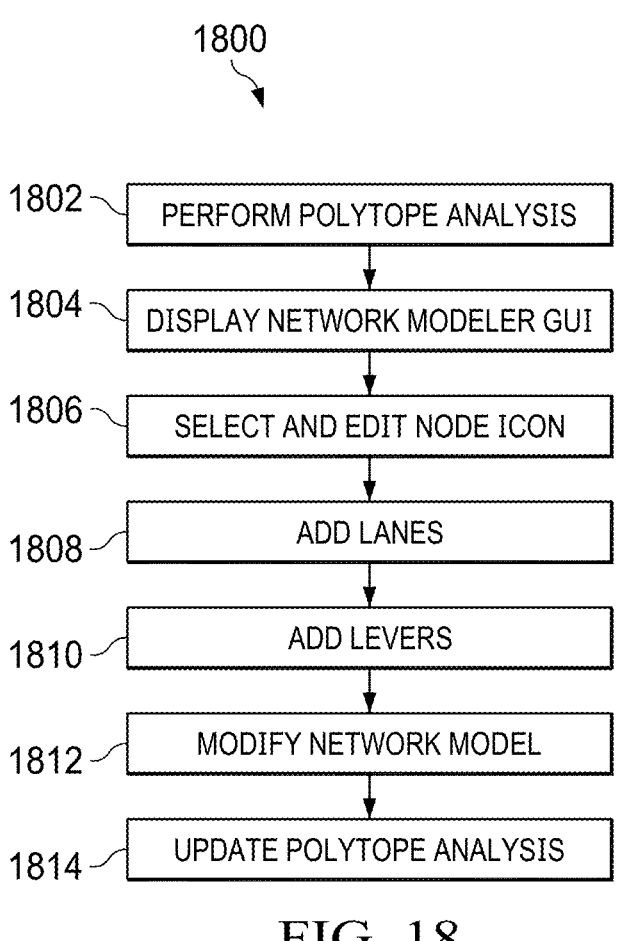
FIG. 18 illustrates a method for visualizing and modifying a model of a supply chain network, in accordance with an embodiment.

FIG. 18 illustrates method 1800 for visualizing and modifying a model of supply chain network 100, in accordance with an embodiment. Method 1800 may be performed by a planning interface system, such as planning interface system 110 of FIG. 1. The method proceeds by one or more activities, which although described in a particular order, may be performed in one or more permutations, combinations, orders, or repetitions, according to particular needs.

At activity 1802, polytope analysis module 206 of planning interface system 110 performs a polytope analysis using one or more selected goals and levers. Upon completion of the polytope analysis, user interface module 204 may display a new GUI or update a previous GUI, such as the input adjustment GUI, to indicate the completion of the polytope analysis to the user. In embodiments, user interface module 204 may enable the user to select and define new levers and/or goals, or deselect or remove existing levers and/or goals for use in one or more additional polytope analyses via input to the input adjustment GUI. By way of further illustration, example input adjustment GUIs are illustrated, and discussed above, with respect to FIGS. 8A-8B.

At activity 1804, user interface module 204 may generate a network modeler GUI in response to user input and may display a network modeler GUI via one or more output devices associated with supply chain network 100, such as one or more output devices 154 of one or more computers 150. In embodiments, user interface module displays a model of supply chain network 100 according to the polytope analysis performed in activity 1802.

At activity 1806, user interface module 204 may receive a selection of one or more node icons which may represent various nodes of one or more supply chain entities 140 of supply chain network 100. In embodiments, selection of a node may enable a user to view and edit one or more details of a modeled response plan associated with the particular supply chain entity corresponding to the selected node icon.

At activity 1808, user interface module 204 may receive a selection to add and/or modify one or more transportation lanes between nodes of one or more supply chain entities 140 of supply chain network 100. In embodiments, user interface module 204 may receive, either by input from a user and/or from polytope analysis module 206, one or more parameters characterizing and/or describing one or more transportation lanes. In embodiments, one or more parameters may characterize and/or describe any aspect of a transportation lane, for example, a mode of transportation and/or a duration of expected time of travel along a lane between two or more nodes.

At activity 1810, user interface module 204 may receive a selection to add and/or delete one or more levers. In embodiments, levers may comprise any change that may be made to supply chain network 100, for example, adding transportation lanes, changing price, adding manufacturing and/or transportation capacity, and the like.

At activity 1812, user interface module 204 may receive one or more modifications to a model of supply chain network 100. In embodiments one or more changes may comprise any configuration and/or reconfiguration of supply chain network 100, for example, cloning nodes, adding and/or deleting lanes, adding and/or deleting levers, and the like.

At activity 1814, polytope analysis module 206 of planning interface system 110 updates a polytope analysis based on a modified and/or adjusted supply chain model resulting from activities 1804-1812, as described in greater detail above. In embodiments, user interface module 204 displays one or more possible response plans resulting from the polytope analysis, as described in greater detail above.

Reference in the foregoing specification to "one embodiment", "an embodiment", or "some embodiments" means that a particular factor, structure, or characteristic described in connection with the embodiment is included in at least one embodiment of the invention. The appearances of the phrase "in one embodiment" in various places in the specification are not necessarily all referring to the same embodiment.

While the exemplary embodiments have been illustrated and described, it will be understood that various changes and modifications to the foregoing embodiments may become apparent to those skilled in the art without departing from the spirit and scope of the present invention.

What is claimed is:

1. A system for visualizing and modifying a model of a supply chain network, comprising:

a computer, comprising a processor and memory, and configured to:

perform a polytope analysis using one or more goals and one or more levers;

generate a network modeler GUI of a modeled supply chain network associated with the polytope analysis;

receive a selection to edit one or more node icons of the modeled supply chain network displayed on the network modeler GUI;

receive a selection to add one or more transportation lanes to the modeled supply chain network;

receive a selection to add one or more levers to the modeled supply chain network;

receive a selection to modify the modeled supply chain network;

receive a selection to define at least one assumption, wherein the at least one assumption comprises one or more explicit data objects used to capture scope, impact, and one or more optional mitigation actions;

update the polytope analysis based on at least one of the received selections; and generate and display a response plan based on the updated polytope analysis; and automated robotic production machinery configured to:

produce products based, at least in part, on the response plan.

2. The system of claim 1, wherein the network modeler GUI comprises a display of one or more of: an info pane, a map pane, one or more node icons and one or more transportation lanes.

3. The system of claim 2, wherein the map pane comprises one or more of: a source window, a make window, a distribute window and a sell window.

4. The system of claim 1, wherein the selection to modify the modeled supply chain network comprises one or more of: cloning one or more nodes, adding one or more transportation lanes, and adding one or more levers.

5. The system of claim 1, wherein the one or more added transportation lanes each comprise one or more parameters.

6. The system of claim 1, wherein the network modeler GUI further comprises a display of one or more assumptions and one or more goals.

7. The system of claim 1, wherein the network modeler GUI further comprises one or more selectable elements configured to hide displayed information and one or more selectable elements configured to expand displayed information.

8. A computer-implemented method for visualizing and modifying a model of a supply chain network, comprising:

performing, by a computer comprising a processor and memory, a polytope analysis using one or more goals and one or more levers;

generating, by the computer, a network modeler GUI of a modeled supply chain network associated with the polytope analysis;

receiving, by the computer, a selection to edit one or more node icons of the modeled supply chain network displayed on the network modeler GUI;

receiving, by the computer, a selection to add one or more transportation lanes to the modeled supply chain network;

receiving, by the computer, a selection to add one or more levers to the modeled supply chain network;

receiving, by the computer, a selection to modify the modeled supply chain network;

receiving, by the computer, a selection to define at least one assumption, wherein the at least one assumption comprises one or more explicit data objects used to capture scope, impact, and one or more optional mitigation actions;

updating, by the computer, the polytope analysis based on at least one of the received selections;

generating and displaying, by the computer, a response plan based on the updated polytope analysis; and producing products, by automated robotic production machinery, based, at least in part, on the response plan.

9. The computer-implemented method of claim 8, wherein the network modeler GUI comprises a display of one or more of: an info pane, a map pane, one or more node icons and one or more transportation lanes.

10. The computer-implemented method of claim 9, wherein the map pane comprises one or more of: a source window, a make window, a distribute window and a sell window.

11. The computer-implemented method of claim 8, wherein the selection to modify the modeled supply chain network comprises one or more of: cloning one or more nodes, adding one or more transportation lanes, and adding one or more levers.

12. The computer-implemented method of claim 8, wherein the one or more added transportation lanes each comprise one or more parameters.

13. The computer-implemented method of claim 8, wherein the network modeler GUI further comprises a display of one or more assumptions and one or more goals.

14. The computer-implemented method of claim 8, wherein the network modeler GUI further comprises one or more selectable elements configured to hide displayed information and one or more selectable elements configured to expand displayed information.

15. A non-transitory computer-readable storage medium embodied with software for visualizing and modifying a model of a supply chain network, the software when executed by a computer is configured to:

perform a polytope analysis using one or more goals and one or more levers;

generate a network modeler GUI of a modeled supply chain network associated with the polytope analysis;

receive a selection to edit one or more node icons of the modeled supply chain network displayed on the network modeler GUI;

receive a selection to add one or more transportation lanes to the modeled supply chain network;

receive a selection to add one or more levers to the modeled supply chain network;

receive a selection to modify the modeled supply chain network;

receive a selection to define at least one assumption, wherein the at least one assumption comprises one or more explicit data objects used to capture scope, impact, and one or more optional mitigation actions;

update the polytope analysis based on at least one of the received selections;

generate and display a response plan based on the updated polytope analysis; and produce products, by automated robotic production machinery, based, at least in part, on the response plan.

16. The non-transitory computer-readable storage medium of claim 15, wherein the network modeler GUI comprises a display of one or more of: an info pane, a map pane, one or more node icons and one or more transportation lanes.

17. The non-transitory computer-readable storage medium of claim 16, wherein the map pane comprises one or more of: a source window, a make window, a distribute window and a sell window.

18. The non-transitory computer-readable storage medium of claim 15, wherein the selection to modify the modeled supply chain network comprises one or more of: cloning one or more nodes, adding one or more transportation lanes, and adding one or more levers.

19. The non-transitory computer-readable storage medium of claim 15, wherein the one or more added transportation lanes each comprise one or more parameters.

20. The non-transitory computer-readable storage medium of claim 15, wherein the network modeler GUI further comprises a display of one or more assumptions and one or more goals.

\* \* \* \* \*